US011281555B2

United States Patent
Hashimoto

(10) Patent No.: US 11,281,555 B2
(45) Date of Patent: Mar. 22, 2022

(54) MANAGEMENT DEVICE, MANAGEMENT METHOD, AND MANAGEMENT COMPUTER PROGRAM PRODUCT WITH AREA SCREEN AND APPARATUS SCREEN CONTROL

(71) Applicant: Sumitomo Electric Industries, Ltd., Osaka (JP)

(72) Inventor: Hidehiko Hashimoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/083,369

(22) Filed: Oct. 29, 2020

(65) Prior Publication Data
US 2021/0042205 A1 Feb. 11, 2021

Related U.S. Application Data

(63) Continuation of application No. PCT/JP2019/017607, filed on Apr. 25, 2019.

(30) Foreign Application Priority Data

May 15, 2018 (JP) .............................. JP2018-093474

(51) Int. Cl.
*G06F 11/30* (2006.01)
*G06F 11/32* (2006.01)
(Continued)

(52) U.S. Cl.
CPC .......... *G06F 11/322* (2013.01); *G06F 3/1423* (2013.01); *G06F 11/3089* (2013.01); *G06F 17/18* (2013.01)

(58) Field of Classification Search
None
See application file for complete search history.

(56) References Cited

U.S. PATENT DOCUMENTS 6,416,471 B1 * 7/2002 Kumar ................. A61B 5/0022
 600/300
10,589,044 B2 * 3/2020 Sherman ........... A61M 16/0051
(Continued)

FOREIGN PATENT DOCUMENTS

JP 2004-145742 A 5/2004
JP 2006-208000 A 8/2006
(Continued)

OTHER PUBLICATIONS

International Search Report and Written Opinion dated Jul. 23, 2019 for PCT/JP2019/017607 filed on Apr. 25, 2019, 10 pages including English Translation of the International Search Report.

*Primary Examiner* — Joni Hsu
(74) *Attorney, Agent, or Firm* — Xsensus LLP

(57) ABSTRACT

A management device includes circuitry configured to acquire sensor data that indicates measurement results of one or more of a plurality of sensors, control display of first content on a first screen in response to receiving a setting of a monitoring target range regarding measurement values, and control display of second content on a second screen in response to receiving a setting of a determination condition of an abnormality determination, perform a statistical process on a data group including intra-range data, the intra-range data being the sensor data included in the monitoring target range regarding the measurement values, out of the sensor data previously acquired, and in response to a result of the statistical process satisfying the determination condition, perform a predetermined output operation related to the abnormality determination.

19 Claims, 16 Drawing Sheets

(51) Int. Cl.
    *G06F 3/14*     (2006.01)
    *G06F 17/18*     (2006.01)

(56) References Cited

U.S. PATENT DOCUMENTS

| | | |
|---|---|---|
| 2006/0168975 A1 | 8/2006 | Malone et al. |
| 2009/0231341 A1* | 9/2009 | Lord .................... A61B 5/7445 345/440 |
| 2012/0271557 A1* | 10/2012 | Sekimoto ............. A61B 5/4866 702/19 |
| 2013/0063272 A1* | 3/2013 | Bhageria ............... H02J 3/0012 340/650 |
| 2014/0033103 A1* | 1/2014 | Boyer ................... G06F 3/0485 715/771 |
| 2017/0083016 A1 | 3/2017 | Imanari et al. |
| 2017/0263110 A1* | 9/2017 | O'Connell ............... G08B 5/36 |
| 2018/0232294 A1 | 8/2018 | Oyama et al. |
| 2018/0337820 A1* | 11/2018 | Chen ....................... H04L 67/10 |

FOREIGN PATENT DOCUMENTS

| | | |
|---|---|---|
| JP | 2017-111571 A | 6/2017 |
| WO | 2015/177870 A1 | 11/2015 |

\* cited by examiner

MANAGEMENT DEVICE, MANAGEMENT METHOD, AND MANAGEMENT COMPUTER PROGRAM PRODUCT WITH AREA SCREEN AND APPARATUS SCREEN CONTROL

CROSS-REFERENCE TO RELATED APPLICATIONS

The present application is a continuation application of International Patent Application PCT/JP2019/017607, filed on Apr. 25, 2019, which claims priority to Japanese Patent Application No. 2018-093474 filed on May 15, 2018. The entire contents of these applications are incorporated herein by reference in their entirety.

TECHNICAL FIELD

The present invention relates to a management device, a management method, and a management program.

BACKGROUND ART

Japanese Laid-Open Patent Publication No. 2006-208000 (PATENT LITERATURE 1) discloses a technology as follows. That is, an airflow distribution apparatus, for use in a data center, includes: at least one airflow sensor coupled to a plurality of fans in at least one server in the data center; and a controller coupled to the at least one airflow sensor, and configured to monitor airflow regarding the plurality of fans and control cooling in the data center according to the sensed airflow.

CITATION LIST

Patent Literature

PATENT LITERATURE 1: Japanese Laid-Open Patent Publication No. 2006-208000

SUMMARY OF INVENTION (1) A management device includes circuitry configured to acquire sensor data that indicates measurement results of one or more of a plurality of sensors, control display of first content on a first screen in response to receiving a setting of a monitoring target range regarding measurement values, and control display of second content on a second screen in response to receiving a setting of a determination condition of an abnormality determination, perform a statistical process on a data group including intra-range data, the intra-range data being the sensor data included in the monitoring target range regarding the measurement values, out of the sensor data previously acquired, and in response to a result of the statistical process satisfying the determination condition, perform a predetermined output operation related to the abnormality determination.

(9) A management method performed by a management device, comprising: acquiring sensor data indicating measurement results of one or a plurality of sensors; displaying first content on a first screen in response to receiving a setting of a monitoring target range regarding measurement values; displaying second content on a second screen in response to receiving a setting of a determination condition of abnormality determination; performing a statistical process for a data group including intra-range data, the intra-range data being the sensor data included in the monitoring target range regarding the measurement values, out of the acquired sensor data; and in response to a result of the statistical process satisfying the determination condition, performing a predetermined output operation related to the abnormality determination.

(10) A non-transitory computer-readable storage medium having stored therein computer-readable instructions as part of a management program used in a management device, the program when executed by a computer causing the computer to implement a method, the method comprising: displaying first content on a first screen in response to receiving a setting of a monitoring target range regarding measurement values; displaying second content on a second screen in response to receiving a setting of a determination condition of abnormality determination; performing a statistical process for a data group including intra-range data, the intra-range data being the sensor data included in the monitoring target range regarding the measurement values, out of the acquired sensor data; and in response to a result of the statistical process satisfying the determination condition, performing a predetermined output operation related to the abnormality determination.

One mode of the present disclosure can be realized as a management device that includes such a characteristic processing unit, and can also be realized as a semiconductor integrated circuit that realizes a part of or the entire management device, or as a management system including the management device.

DESCRIPTION OF EMBODIMENTS

Figure 1:
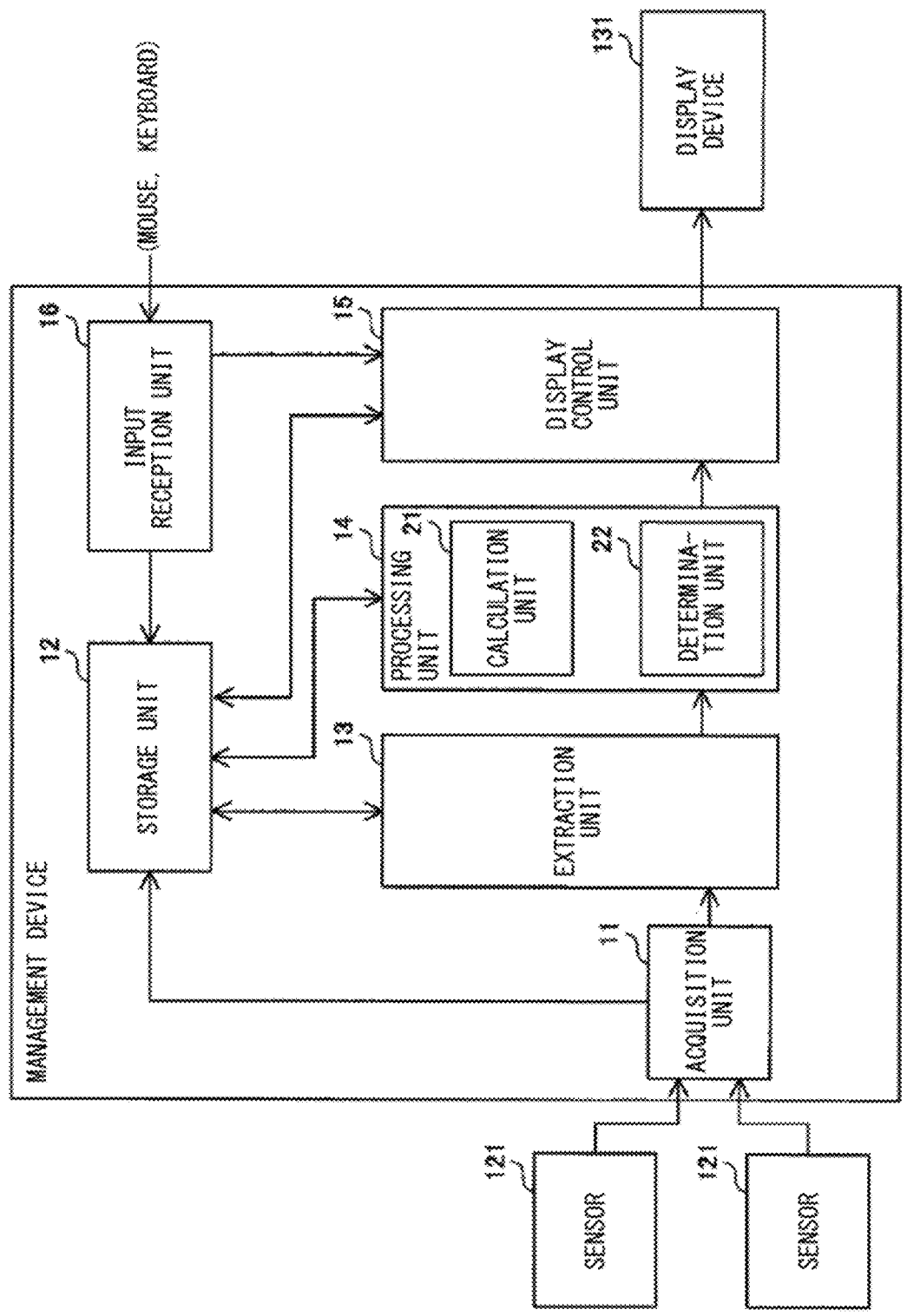
FIG. 1 shows a configuration of a management system according to an embodiment of the present disclosure.

To date, a technology of monitoring the state of an apparatus by use of a measurement result of a sensor has been developed.

Problems to be Solved by the Present Disclosure

In the case where monitoring of an apparatus is performed based on a measurement result of a sensor, a technique of removing unnecessary information such as noise from the measurement result has been demanded for more appropriate monitoring.

The present disclosure is made to solve the above-described problems, and it is an object of the present disclosure to provide a management device, a management method, and a management program capable of appropriately performing monitoring of an apparatus, based on a measurement result of a sensor.

Effects of the Present Disclosure

According to the present disclosure, monitoring of an apparatus based on a measurement result of a sensor can be performed more appropriately.

Description of Embodiment of the Present Disclosure

First, contents of embodiments of the present disclosure are listed and described.

(1) A management device according to an embodiment of the present disclosure includes: an acquisition unit configured to acquire sensor data indicating measurement results of one or a plurality of sensors; a display control unit configured to perform control of displaying a screen that receives a setting of a monitoring target range regarding measurement values, and a screen that receives a setting of a determination condition of abnormality determination; a calculation unit configured to perform a statistical process for a data group including intra-range data, the intra-range data being the sensor data included in the monitoring target range regarding the measurement values, out of the sensor data acquired by the acquisition unit; and an output unit configured to perform a predetermined output when a result of the statistical process performed by the calculation unit satisfies the determination condition.

Since the above configuration receives the setting of the monitoring target range and the setting of the determination condition of abnormality determination, appropriate abnormality determination can be performed according to the measurement targets of the sensors, etc. Furthermore, since the data group including the intra-range data is subjected to the statistical process, more appropriate abnormality determination can be performed by use of the data group in which variations in the measurement values, etc., are suppressed, as compared to the case where abnormality determination is performed by use of a plurality of pieces of sensor data as they are. Therefore, monitoring of the apparatuses based on the measurement results of the sensors can be performed more appropriately.

(2) Preferably, the display control unit further performs control of displaying a screen that receives a setting of a monitoring target range regarding a period, and the calculation unit performs a statistical process for a data group including intra-range data, the intra-range data being the sensor data that are included in the monitoring target range regarding the measurement values and are included in the monitoring target range regarding the period, out of the sensor data acquired by the acquisition unit.

As described above, since not only the setting regarding the measurement values but also the setting of the monitoring target range regarding the period are received, appropriate abnormality determination can be performed even if the operating state of the apparatus varies depending on the period.

(3) More preferably, on the screen, cyclic periods can be set as the aforementioned period.

With this configuration, appropriate abnormality determination can be performed for an apparatus whose operating state or the like changes in cycles.

(4) Preferably, the display control unit further performs control of displaying a screen that receives a setting of a method for processing extra-range data that are the sensor data not included in the intra-range data, and the calculation unit performs a statistical process for a data group in which a processing result of the extra-range data obtained by the set processing method is added to the intra-range data.

With this configuration, more appropriate abnormality determination can be performed by use of the data group including the extra-range data having been subjected to the desired process.

(5) Preferably, the display control unit further performs control of displaying a sensor screen that shows an apparatus, and states of measurement results of a plurality of sensors mounted on the apparatus. The display control unit displays the states in different modes on the sensor screen, according to whether or not the corresponding sensor data satisfy the determination condition. When a predetermined operation has been performed to the states on the sensor screen, the display control unit displays a screen related to at least one of the intra-range data and the determination condition, or a screen for transition to the screen.

With this configuration, when the user confirms the sensor screen, the user can easily visually grasp the states of the measurement results of the respective sensors. In addition, the user can arbitrarily select one sensor while grasping the states of the measurement results of the respective sensors, and cause a screen related to at least one of the intra-range data and the determination condition or a screen for transition to this screen, corresponding to the selected sensor, to be displayed.

(6) More preferably, the display control unit further performs control of displaying an apparatus screen that shows an area, and states of a plurality of apparatuses installed in the area. The display control unit determines the state of the apparatus on the apparatus screen, according to predetermined priorities regarding types of the states, among the states of the measurement results of the sensors in the apparatus. The display control unit displays the sensor screen when a predetermined operation has been performed to the state of the apparatus on the apparatus screen.

With this configuration, for example, the state of an apparatus, which has higher priority for notification to the user, can be displayed on the apparatus screen. In addition, the user can arbitrarily select one apparatus while grasping the states of the respective apparatuses, and cause the sensor screen corresponding to the selected apparatus to be displayed.

(7) More preferably, the display control unit performs control of displaying the apparatus screen that further shows contents regarding the sensors mounted on the apparatus. When a plurality of results of the statistical process corresponding to the plurality of sensors mounted on the apparatus satisfy the determination condition, the display control unit selects, out of the plurality of sensors, a sensor corresponding to the result of the statistical process which has most recently been determined to satisfy the determination condition, and then the display control unit performs control of displaying the apparatus screen that shows the content regarding the selected sensor.

For example, as for a first sensor and a second sensor mounted on the same apparatus, it is assumed that the result of the statistical process corresponding to the first sensor is firstly determined to satisfy the determination condition and thereafter the result of the statistical process corresponding to the second sensor is determined to satisfy the determination result. In this case, in the aforementioned apparatus, a period during which a second portion corresponding to the second sensor was normally operated, is included in a period during which abnormality occurs in a first portion corresponding to the first sensor. That is, the second portion is highly likely to be normalized even when abnormality occurs in the first portion, and therefore, the second portion is highly needed to be restored to the normal state, as compared to the first portion.

As described above, a sensor, which has most recently been determined to satisfy the determination condition, is selected, and control of displaying the content regarding the selected sensor is performed. Therefore, more effective notification can be performed on the apparatus screen.

(8) More specifically, the display control unit further performs control of displaying an area screen that shows states of a plurality of areas. The display control unit determines the state of the area on the area screen, according to predetermined priorities regarding types of the states of the apparatuses, among the states of the apparatuses in the area. The display control unit displays the apparatus screen when a predetermined operation has been performed to the state of the area on the area screen.

With this configuration, for example, the state of an area, which has a higher priority for notification to the user, can be displayed on the area screen. In addition, the user can arbitrarily select one area while grasping the states of the respective areas, and cause the apparatus screen corresponding to the selected area to be displayed.

(9) A management method according to the embodiment of the present disclosure is a management method performed by a management device, and includes: acquiring sensor data indicating measurement results of one or a plurality of sensors; performing control of displaying a screen that receives a setting of a monitoring target range regarding measurement values; performing control of displaying a screen that receives a setting of a determination condition of abnormality determination; performing a statistical process for a data group including intra-range data, the intra-range data being the sensor data included in the monitoring target range regarding the measurement values, out of the acquired sensor data; and performing a predetermined output when a result of the statistical process satisfies the determination condition.

In this method, since the setting of the monitoring target range and the setting of the determination condition of abnormality determination are received, appropriate abnormality determination can be performed according to the measurement targets of the sensors, etc. Furthermore, since the data group including the intra-range data is subjected to the statistical process, more appropriate abnormality determination can be performed by use of the data group in which variations in the measurement values, etc., are suppressed, as compared to the case where abnormality determination is performed by use of a plurality of pieces of sensor data as they are. Therefore, monitoring of the apparatuses based on the measurement results of the sensors can be performed more appropriately.

(10) A management program according to the embodiment of the present disclosure is a management program used in a management device, and causes a computer to function as: an acquisition unit configured to acquire sensor data indicating measurement results of one or a plurality of sensors; a display control unit configured to perform control of displaying a screen that receives a setting of a monitoring target range regarding measurement values, and a screen that receives a setting of a determination condition of abnormality determination; a calculation unit configured to perform a statistical process for a data group including intra-range data, the intra-range data being the sensor data included in the monitoring target range regarding the measurement values, out of the sensor data acquired by the acquisition unit; and an output unit configured to perform a predetermined output when a result of the statistical process performed by the calculation unit satisfies the determination condition.

Since the above configuration receives the setting of the monitoring target range and the setting of the determination condition of abnormality determination, appropriate abnormality determination can be performed according to the measurement targets of the sensors, etc. Furthermore, since the data group including the intra-range data is subjected to the statistical process, more appropriate abnormality determination can be performed by use of the data group in which variations in the measurement values, etc., are suppressed, as compared to the case where abnormality determination is performed by use of a plurality of pieces of sensor data as they are. Therefore, monitoring of the apparatuses based on the measurement results of the sensors can be performed more appropriately.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

<Configuration and Basic Operation>

[Management System]

FIG. 1 shows a configuration of a management system according to an embodiment of the present disclosure.

With reference to FIG. 1, the management system 201 includes a management device 101, one or a plurality of sensors 121, and a display device 131. As an example, FIG. 1 shows two sensors 121.

Each sensor 121 is, for example, a sensor mounted on or placed near an apparatus X. The sensor 121 periodically or non-periodically measures the temperature of the apparatus X, vibration of the apparatus X, the flow rate of cooling water that flows inside the apparatus X, or the like. The sensor 121 transmits sensor data indicating, for example, the measurement result, the measurement date and time, and a sensor ID (Identification) to the management device 101 wirelessly or via a wire, which in turn may be used to control apparatus X.

The management device 101 receives the sensor data transmitted from each sensor 121. Based on a plurality of pieces of sensor data received, the management device 101 confirms the states of the measurement results of the sensors 121, i.e., the state of the apparatus X indicated by the measurement results. Then, the management device 101 performs control of displaying, on the display device 131, a screen based on the states of the measurement results of the sensors 121. The management device 101 and the display device 131 may be integrated with each other.

[Management Device]

The management device 101 includes an acquisition unit 11, a storage unit 12, an extraction unit 13, a processing unit 14, a display control unit 15, and an input reception unit 16. The processing unit 14 includes a calculation unit 21 and a determination unit (output unit) 22. While the present description uses the terms "device" and "unit" for convenience, it should be understood that the devices/units are implemented in circuitry that may be configured by software (computer readable instructions) to perform the operations described herein. Moreover, the more specific circuitry components included in the management device 101 are provided in more detail in FIG. 16, and the associated description.

The storage unit 12 has, stored therein in advance, area information indicating a list of areas as targets to be managed by the management device 101, apparatus information indicating a list of apparatuses X in each area, and sensor information indicating a list of sensors 121 for each apparatus X.

The area information further indicates positional relationships between the areas. The apparatus information further indicates positional relationships between a plurality of apparatuses X in each of the plurality of areas. The sensor information further indicates positional relationships between a plurality of sensors 121 in each of the plurality of apparatuses X.

The acquisition unit 11 receives the sensor data transmitted from each sensor 121, and stores the received sensor data in the storage unit 12.

The input reception unit 16 receives an input of a setting content or the like related to abnormality determination for an apparatus X. For example, the input reception unit 16 stores, in the storage unit 12, setting information indicating the setting content inputted by a user through a keyboard or a mouse. Instead of using the keyboard or the mouse, the user may input the setting content or the like to the management device 101 through a touch panel of a tablet, a smartphone, or the like.

Based on the setting information stored in the storage unit 12, the extraction unit 13 extracts a plurality of pieces of sensor data to be used for abnormality determination for the apparatus X from among the plurality of pieces of sensor data stored in the storage unit 12. More specifically, the extraction unit 13 extracts a data group including a plurality of pieces of sensor data included in a monitoring target range R regarding measurement values, which is set by the user. The user can set a monitoring target range R for each sensor 121.

Figure 2:
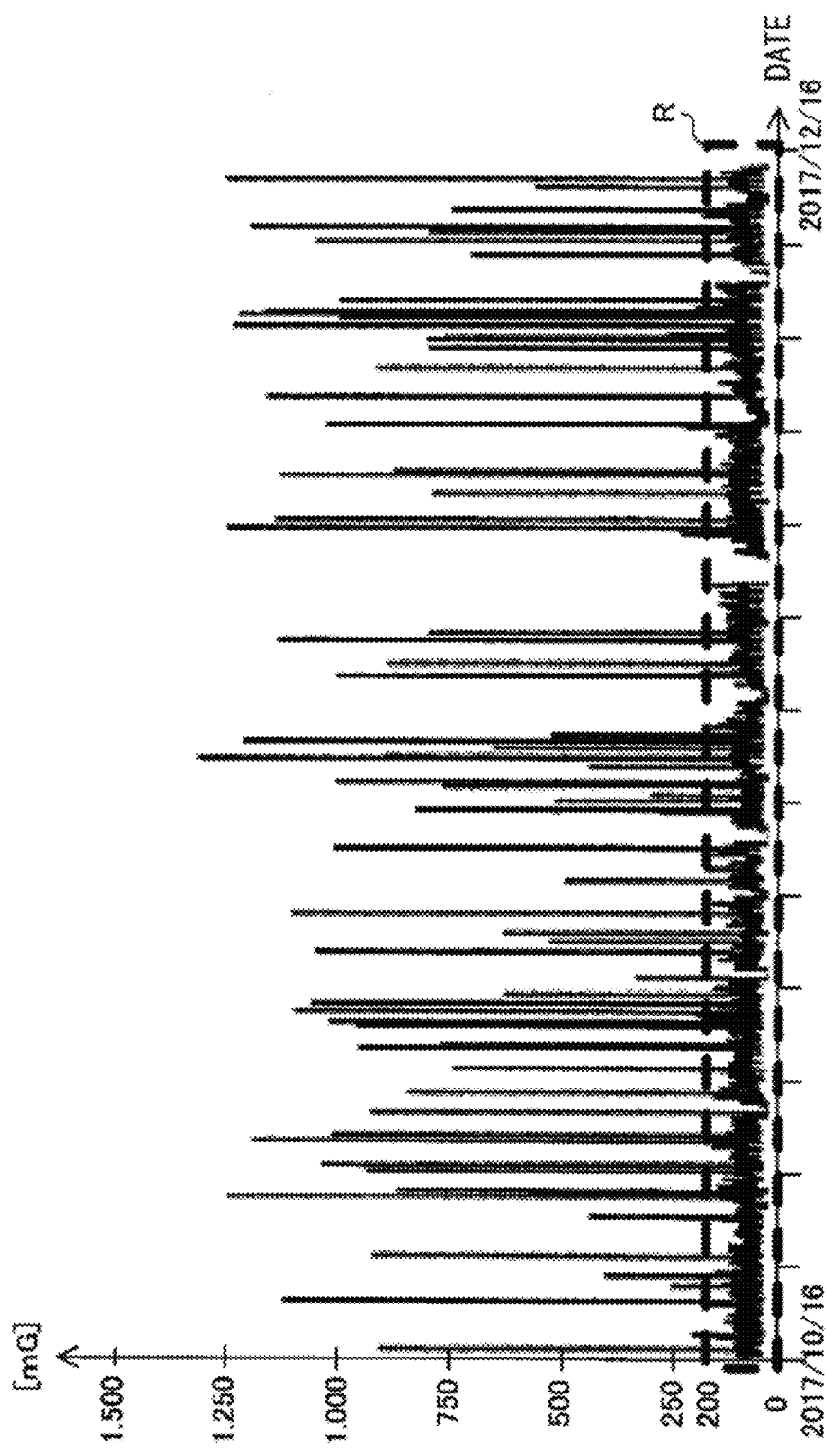
FIG. 2 shows example 1 of a data group extracted by an extraction unit in the management device according to the embodiment of the present disclosure.

FIG. 2 shows example 1 of a data group extracted by the extraction unit in the management device according to the embodiment of the present disclosure. FIG. 2 shows time-series changes in the measurement results based on a plurality of pieces of sensor data transmitted from a certain sensor 121. In FIG. 2, the vertical axis shows an effective value (RMS) [mG] of vibration detected by a vibration sensor as the sensor 121, and the horizontal axis shows date.

With reference to FIG. 2, it is assumed that the user sets a range of measurement values from 0 to 200 as a monitoring target range R of a certain sensor 121. In this case, the extraction unit 13 extracts, from among the plurality of pieces of sensor data stored in the storage unit 12, a plurality of pieces of sensor data (hereinafter also referred to as "intra-range data") that have been transmitted from the sensor 121 and indicate the measurement results included in the monitoring target range R. Then, the extraction unit 13 outputs, to the processing unit 14, the data group including the extracted plurality of pieces of intra-range data.

Thus, the extraction unit 13 extracts a data group obtained by excluding sensor data (hereinafter also referred to as "extra-range data") not included in the intra-range data, from the sensor data transmitted from the sensor 121.

The extraction unit 13 may perform a process of a method set for the extra-range data, and extract the extra-range data together with the intra-range data.

For example, it is assumed that the user sets, for a certain sensor 121, in advance, a method of changing the measurement results indicated by the extra-range data to zero. In this case, the extraction unit 13 performs a process of changing the measurement results indicated by the respective pieces of extra-range data according to the set method, and extracts a data group obtained by adding the processing result of the extra-range data to the intra-range data.

Meanwhile, for example, it is assumed that the user sets, for a certain sensor 121, in advance, a method of changing the measurement results greater than an upper-limit value of the monitoring target range R to the upper-limit value, and changing the measurement results smaller than a lower-limit value of the monitoring target range R to the lower-limit value. In this case, the extraction unit 13 performs a process of changing the measurement results indicated by the respective pieces of extra-range data according to the set method, and extracts a data group obtained by adding the processing result of the extra-range data to the intra-range data.

Figure 3:
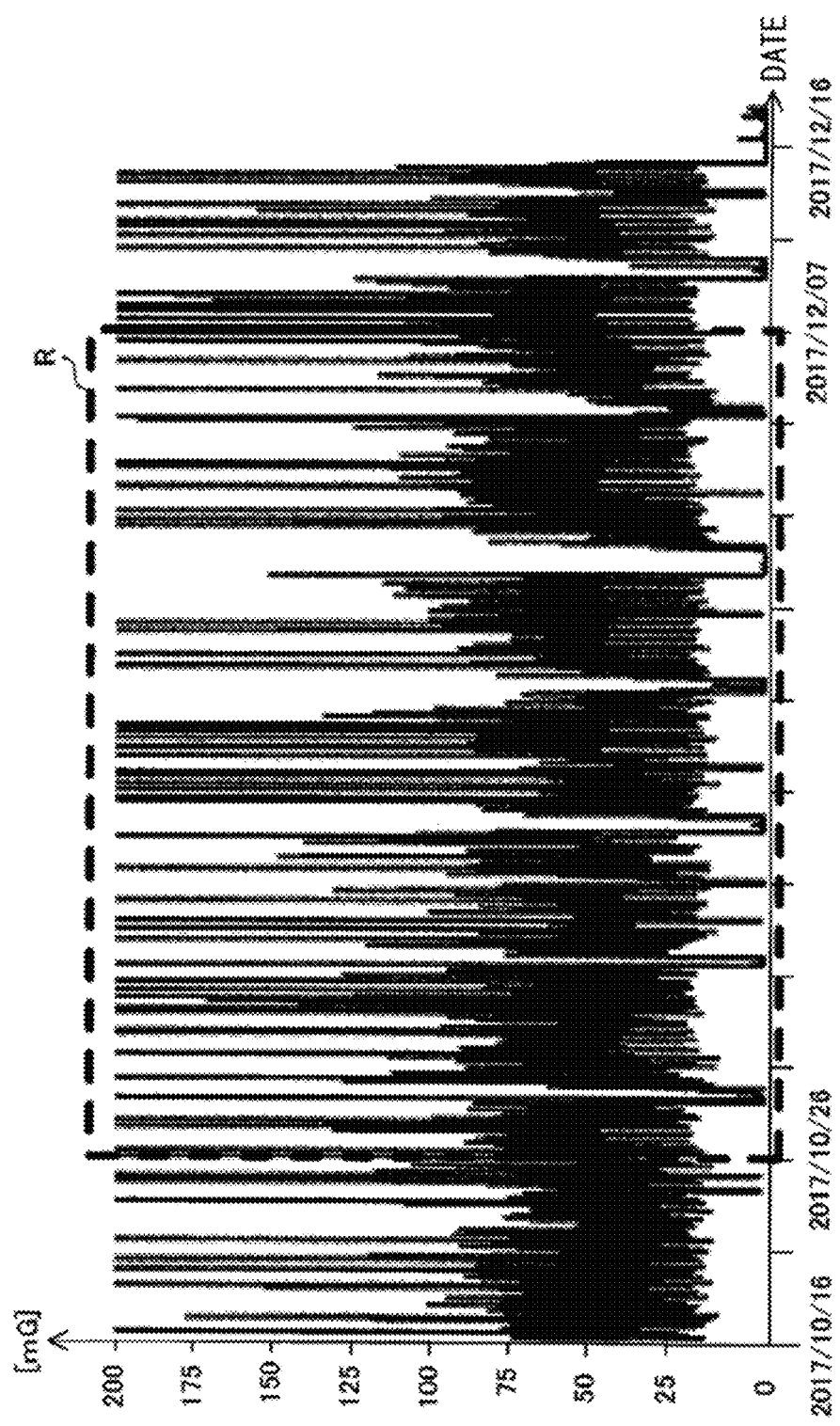
FIG. 3 shows example 2 of a data group extracted by the extraction unit in the management device according to the embodiment of the present disclosure.

FIG. 3 shows example 2 of a data group extracted by the extraction unit in the management device according to the embodiment of the present disclosure. FIG. 3 shows time-series changes in measurement results based on a plurality of pieces of sensor data transmitted from a certain sensor 121. In FIG. 3, the vertical axis shows an effective value (RMS) [mG] of vibration detected by a vibration sensor as the sensor 121, and the horizontal axis shows date.

With reference to FIG. 3, a monitoring target range R may be a range regarding a period. For example, the user can set a monitoring target range R regarding a period for each sensor 121.

Specifically, it is assumed that the user sets, as a monitoring target range R of a certain sensor 121, a period from 2017/10/26 to 2017/12/7. In this case, from among the plurality of pieces of sensor data stored in the storage unit 12, the extraction unit 13 extracts, as intra-range data, a plurality of pieces of sensor data that have been transmitted from the sensor 121 and indicates the measurement results included in the set range of measurement values and included in the set period. Then, the extraction unit 13 outputs the data group including the extracted plurality of pieces of intra-range data, to the processing unit 14.

Figure 4:
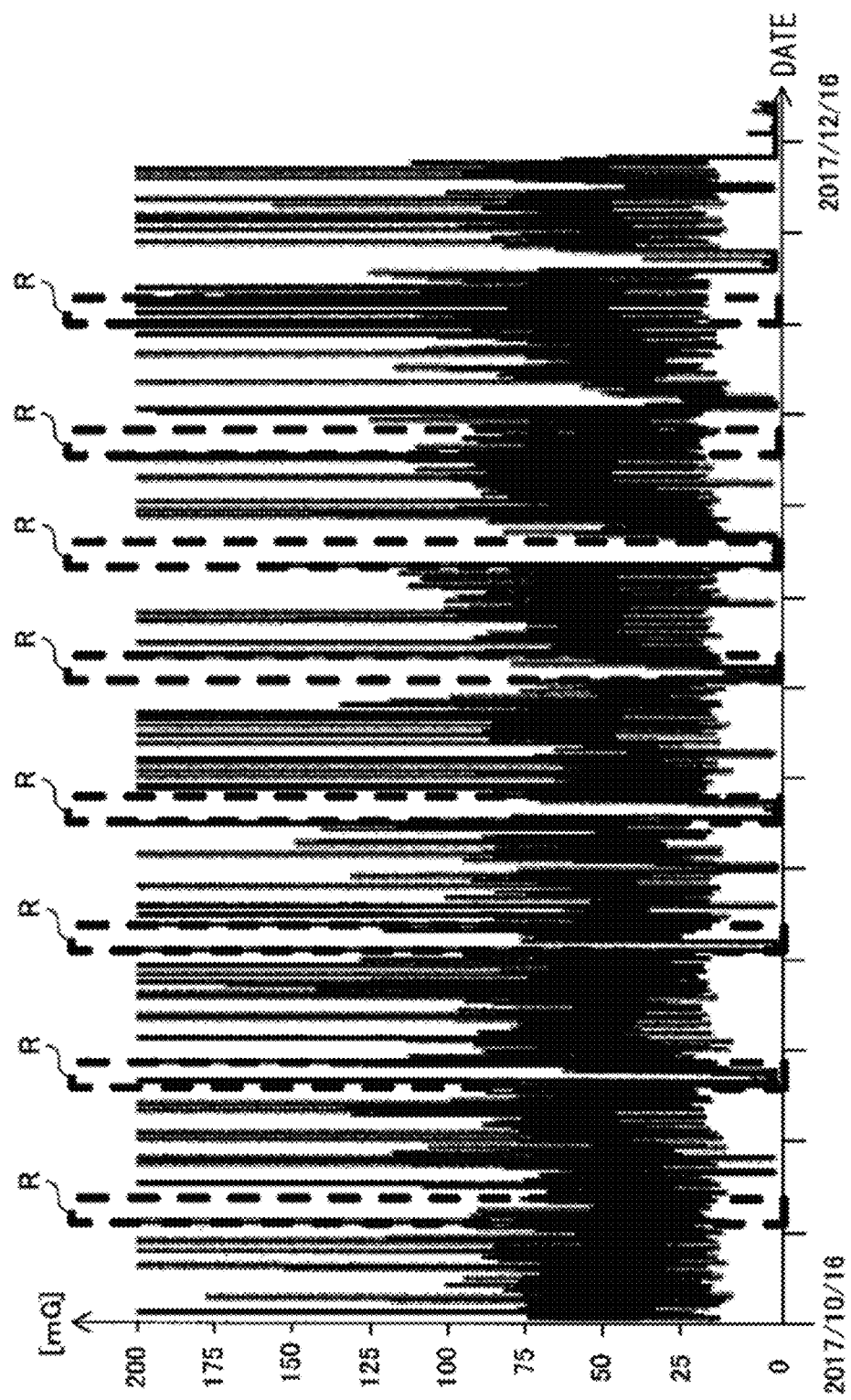
FIG. 4 shows example 3 of a data group extracted by an extraction unit in the management device according to the embodiment of the present disclosure.

FIG. 4 shows example 3 of a data group extracted by the extraction unit in the management device according to the embodiment of the present disclosure. FIG. 4 shows time-series changes in measurement results based on a plurality of pieces of sensor data transmitted from a certain sensor 121. In FIG. 4, the vertical axis shows an effective value (RMS) [mG] of vibration detected by a vibration sensor as the sensor 121, and the horizontal axis shows date.

With reference to FIG. 4, the user may set, as a monitoring target range R of a certain sensor 121, intermittent periods, instead of a continuous period.

Specifically, it is assumed that the user sets cyclic periods, for example, every Monday, as a monitoring target range R of a certain sensor 121. In this case, from among the plurality of pieces of sensor data stored in the storage unit 12, the extraction unit 13 extracts, as intra-range data, a plurality of pieces of sensor data that have been transmitted from the sensor 121 and indicate the measurement results obtained every Monday. Then, the extraction unit 13 outputs the data group including the extracted plurality of pieces of intra-range data, to the processing unit 14.

The extraction unit 13 performs, for each sensor 121, extraction of a data group and output of the extracted data group to the processing unit 14 as described above.

The calculation unit 21 in the processing unit 14 receives the data group outputted from the extraction unit 13, and performs a statistical process for the data group. A method of the statistical process for the data group is set for each sensor 121 by the user in advance, for example. The calculation unit 21 performs, as the statistical process, an averaging process for the plurality of pieces of sensor data included in the data group.

Figure 5:
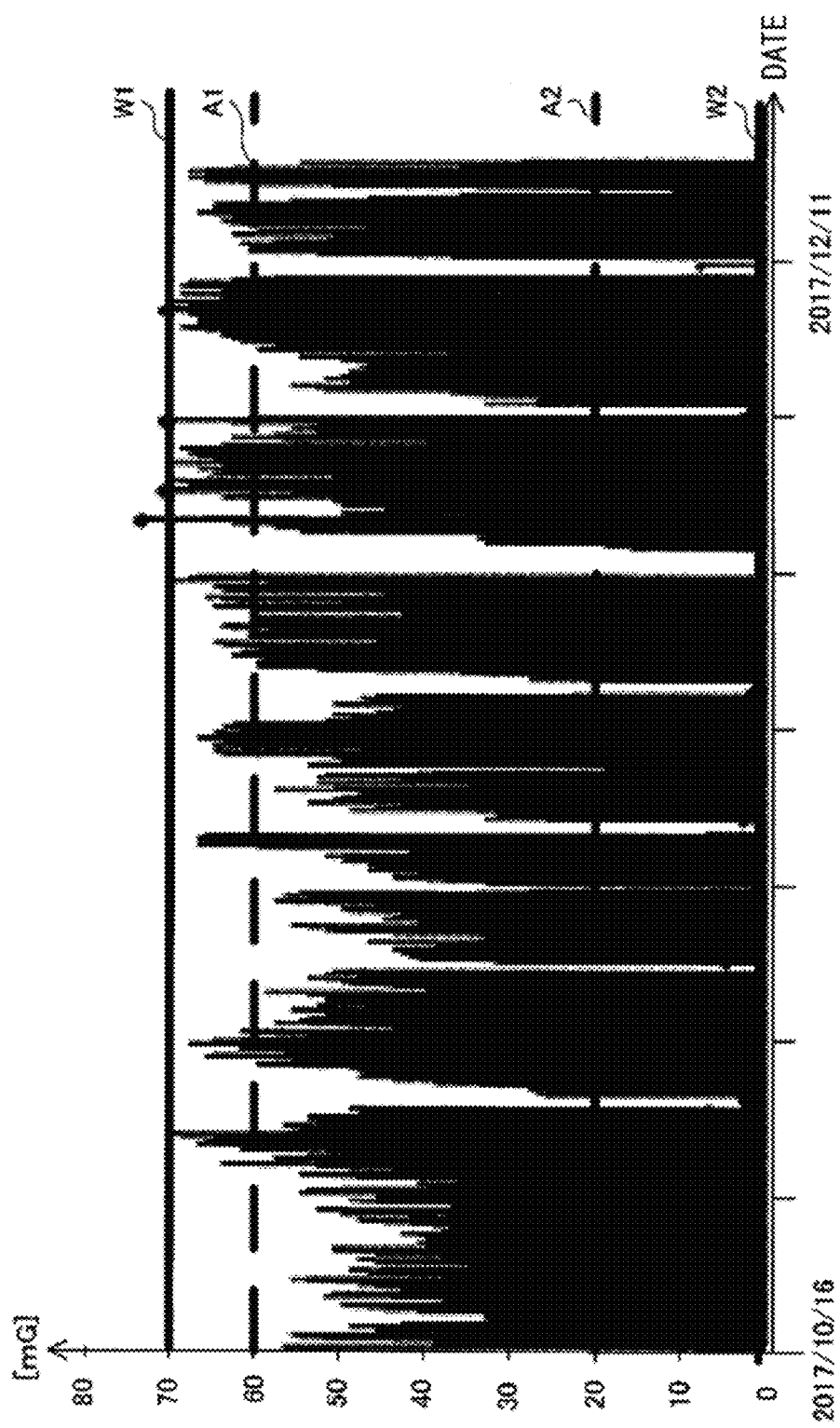
FIG. 5 shows an example of a result of an averaging process performed by a calculation unit in the management device according to the embodiment of the present disclosure.

FIG. 5 shows an example of a result of the averaging process performed by the calculation unit in the management device according to the embodiment of the present disclosure. FIG. 5 shows the result obtained through the averaging process performed on the plurality of pieces of sensor data included in the monitoring target range R shown in FIG. 2.

With reference to FIG. 5, in accordance with the method of the statistical process set by the user, the calculation unit 21 divides a period set as the monitoring target range R at an interval of 60 minutes to obtain divided periods, and calculates an average value of the measurement results in each divided period.

Thus, the calculation unit 21 can obtain, as a result of the statistical process, a graph showing time-series change, per 60 minutes, of the measurement results of the sensor 121 as shown in FIG. 5. Then, the calculation unit 21 outputs processing result information indicating the result of the statistical process to the determination unit 22.

In the averaging process for the plurality of pieces of sensor data, for example, the calculation unit 21 may calculate an average value of the measurement results for each predetermined number of sensor data, instead of calculating an average value in each divided period.

That is, the calculation unit 21 may divide a plurality of pieces of sensor data at measurement timings in the period set as the monitoring target range R, into sets of a predetermined number of sensor data, in chronological order from sensor data with the earliest measurement timing, and may calculate, for each set, an average value of the measurement results indicated by the predetermined number of sensor data.

The calculation unit 21 is not necessarily configured to perform the averaging process for a plurality of pieces of sensor data, as the statistical process. For example, as the statistical process, the calculation unit 21 may calculate, for each divided period, a maximum value, a minimum value, an average of the maximum value and the minimum value, a median, or a modal value of the measurement results in the divided period.

The calculation unit 21 performs, for each sensor 121, the aforementioned statistical process and output of processing result information to the determination unit 22. Since the calculation unit 21 performs the statistical process for a data group, variation in a plurality of pieces of sensor data included in the data group is reduced, which makes it easy to grasp a long-term tendency. The calculation unit 21 may perform a statistical process for one or a plurality of pieces of extra-range data in accordance with a predetermined method for the statistical process.

The determination unit 22 receives the processing result information outputted from the calculation unit 21, and determines, based on the processing result information, whether or not the result of the statistical process satisfies a determination condition of abnormality determination.

Specifically, as shown in FIG. 5, if at least one of a plurality of average values obtained through the statistical process is not included in a range from a warning upper-limit value W1 to a warning lower-limit value W2, the determination unit 22 determines that the measurement result of the corresponding sensor 121 satisfies a first determination condition.

Meanwhile, if all the plurality of average values obtained through the statistical process are included in the range from the warning upper-limit value W1 to the warning lower-limit value W2 and at least one of these average values is not included in a range from a caution upper-limit value A1 to a caution lower-limit value A2, the determination unit 22 determines that the measurement result of the corresponding sensor 121 satisfies a second determination condition.

The warning upper-limit value W1, the warning lower-limit value W2, the caution upper-limit value A1, and the caution lower-limit value A2 are set for each sensor 121 by the user, for example.

Then, when the measurement result of the sensor 121 satisfies the first determination condition or the second determination condition, the determination unit 22 performs a predetermined output, e.g., an information display process. In more detail, the determination unit 22 outputs, to the display control unit 15, determination result information indicating: the sensor 121 corresponding to the measurement result that satisfies the first determination condition (hereinafter simply referred to as "sensor 121 satisfying the first determination condition"); and the sensor 121 corresponding to the measurement result that satisfies the second determination condition (hereinafter simply referred to as "sensor 121 satisfying the second determination condition"). The determination unit 22 stores the determination result information in the storage unit 12.

The display control unit 15 receives the determination result information outputted from the determination unit 22, and performs, based on the determination result information, control of displaying, on the display device 131, a screen according to the states of the measurement results of the plurality of sensors 121, i.e., the state of the corresponding apparatus X indicated by the measurement results. For example, the display control unit 15 performs control of displaying a screen that allows recognition of the sensor 121 satisfying the first determination condition or the second determination condition.

As for the predetermined output, the determination unit 22 may output the determination result information to an output unit (not shown). In this case, the output unit receives the determination result information outputted from the determination unit 22. Then, based on the determination result information, the output unit notifies the user of the sensor 121 satisfying a first determination result or a second determination result, by e-mail or the like. In addition, the output unit may dispatch a command to adjust a control setting for the apparatus being monitored by the sensor 121 to bring the apparatus' observed parameter (e.g., vibration, flow rate, etc.) into conformance with an expected range.

<Specific Example of Display Screen>

Figure 6:
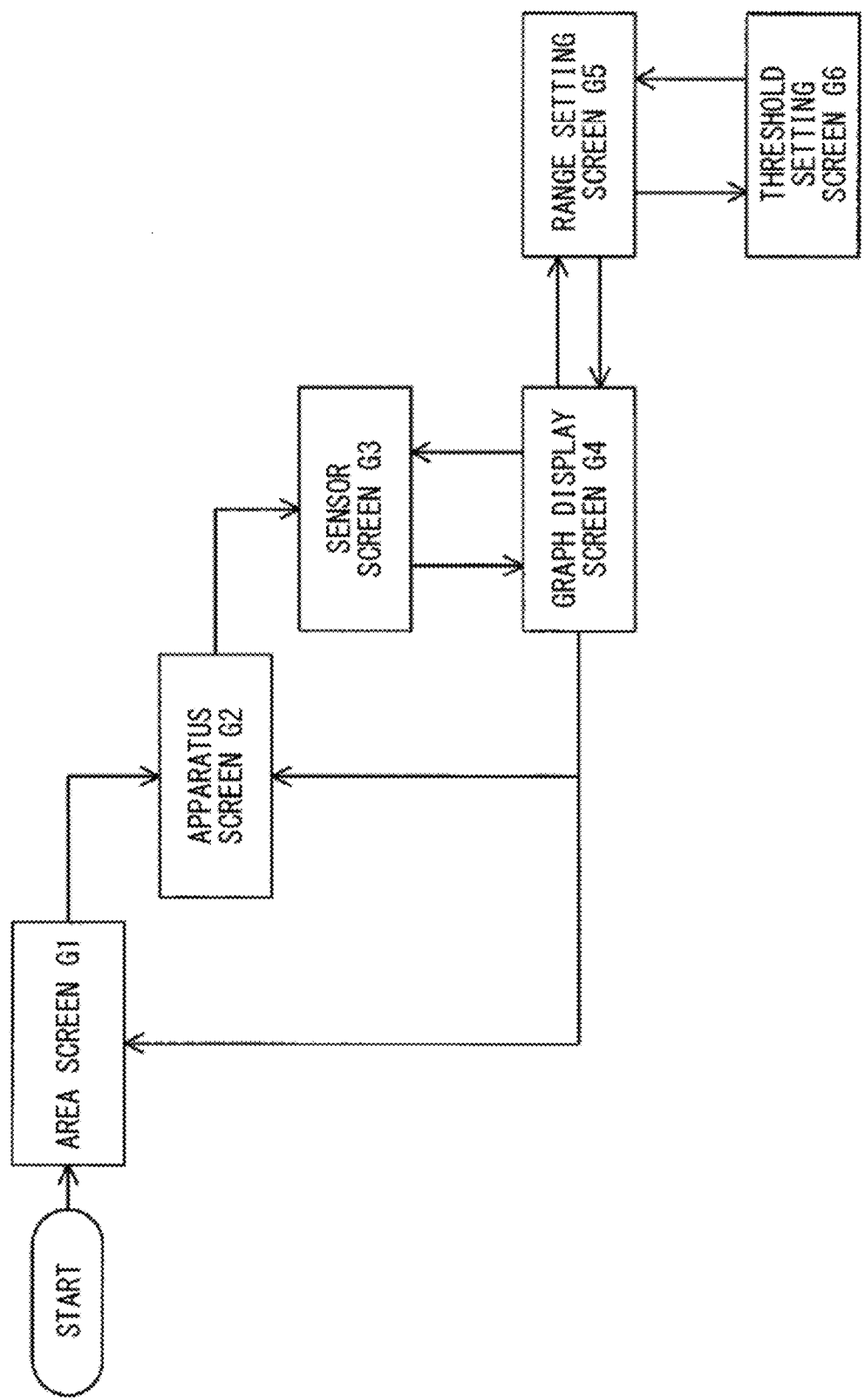
FIG. 6 shows an example of transition of screens displayed on a display device in the management system according to the embodiment of the present disclosure.

FIG. 6 shows an example of transition of screens displayed on the display device in the management system according to the embodiment of the present disclosure.

With reference to FIG. 1 and FIG. 6, when the management device 101 is activated and a predetermined operation is performed by the user, the input reception unit 16 outputs, to the display control unit 15, operation information indicating the content of the operation performed by the user.

The display control unit 15 receives the operation information outputted from the input reception unit 16, and performs control of displaying a screen on the display device 131, based on the operation information. For example, based on the area information stored in the storage unit 12, the display control unit 15 performs control of displaying, on the display device 131, an area screen G1 showing a list of areas to be managed by the management device 101, and the states of the respective areas.

In the state where the area screen G1 is displayed on the display device 131, when a predetermined operation has been performed to the state of an area on the area screen G1 by the user, the display control unit 15 performs control of displaying an apparatus screen G2 showing a list of apparatuses X installed in the area, and the states of the respective apparatuses X.

In the state where the apparatus screen G2 is displayed on the display device 131, when a predetermined operation has been performed to the state of an apparatus X on the apparatus screen G2 by the user, the display control unit 15 performs, based on the sensor information stored in the storage unit 12, control of displaying, on the display device 131, a sensor screen G3 showing a list of sensors 121 in the apparatus X and the states of the measurement results of the respective sensors 121.

In the state where the sensor screen G3 is displayed on the display device 131, when a predetermined operation has been performed to the state of the measurement result of a sensor 121 on the sensor screen G3 by the user, the display control unit 15 performs, based on the plurality of pieces of sensor data stored in the storage unit 12, control of displaying, on the display device 131, a graph display screen G4 showing time-series changes in the measurement results of the sensor 121.

In the state where the graph display screen G4 is displayed on the display device 131, when a predetermined operation has been performed on the graph display screen G4 by the user, the display control unit 15 performs control of displaying, on the display device 131, a range setting screen G5 that receives a setting of a monitoring target range R.

In the state where the range setting screen G5 is displayed on the display device 131, when a predetermined operation has been performed on the range setting screen G5 by the user, the display control unit 15 performs control of displaying, on the display device 131, a threshold setting screen G6 that receives a setting of a method of a statistical process and a setting of a determination condition of abnormality determination.

When a predetermined operation has been performed on the sensor screen G3 by the user, the display control unit 15 may perform control of displaying the range setting screen G5 or the threshold setting screen G6 on the display device 131.

The contents of two or more screens out of the area screen G1, the apparatus screen G2, the sensor screen G3, the graph display screen G4, the range setting screen G5, and the threshold setting screen G6, may be included in the same screen. As for at least one of the area screen G1, the apparatus screen G2, the sensor screen G3, and the graph display screen G4, the display control unit 15 may not necessarily perform control of displaying the screen.

[Area Screen G1]

Figure 7:
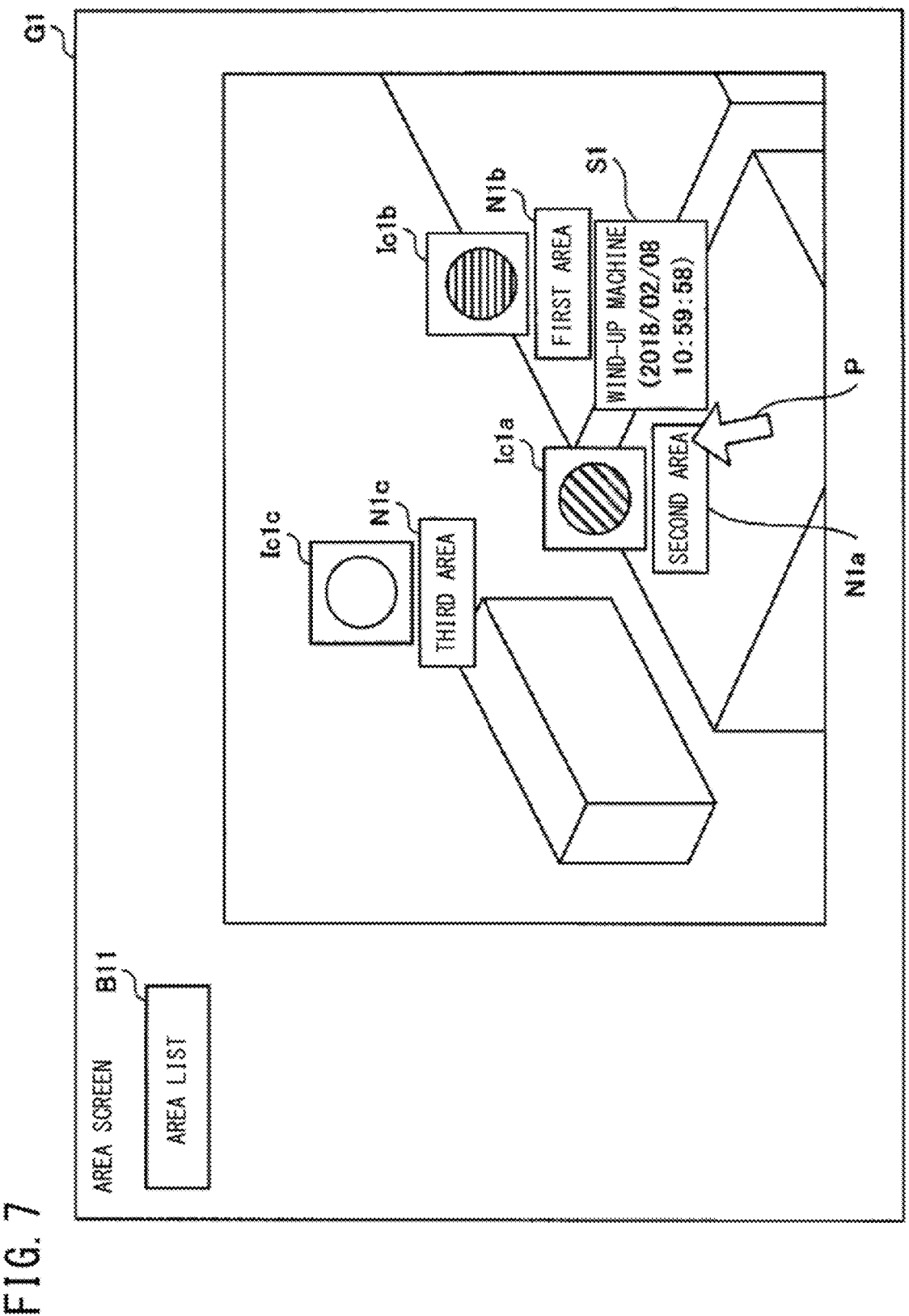
FIG. 7 shows an example of an area screen displayed on the display device in the management system according to the embodiment of the present disclosure.

FIG. 7 shows an example of an area screen displayed on the display device in the management system according to the embodiment of the present disclosure.

With reference to FIG. 7, the display control unit 15 performs control of displaying the area screen G1, based on the area information stored in the storage unit 12. The area screen G1 includes, for example, a plurality of areas, area names N1 of the respective areas, and icons Ic1 indicating the states of the respective areas. The state of an area is a state based on the states of measurement results of sensors 121 included in this area. In FIG. 7, icons Ic1a, Ic1b, and Ic1c are shown as examples of the icons Ic1. In FIG. 7, area names N1a, N1b, and N1c are shown as examples of the area names N1.

In more detail, the display control unit 15 determines the state of each apparatus X, according to predetermined priorities regarding the types of the states of the measurement results of the respective sensors 121. Here, it is assumed that the state satisfying the first determination condition has a higher priority than the state satisfying the second determination condition. In addition, it is assumed that the state satisfying the second determination condition has a higher priority than the state not satisfying the second determination condition.

In this case, for example, the display control unit 15 confirms, for each apparatus X, whether or not there is a sensor 121 satisfying the first determination condition, and whether or not there is a sensor 121 satisfying the second determination condition. If an apparatus X has one or more sensors 121 satisfying the first determination condition, the display control unit 15 determines that an abnormality has occurred in this apparatus X.

Meanwhile, if an apparatus X does not have a sensor 121 satisfying the first determination condition and has one or more sensors 121 satisfying the second determination condition, the display control unit 15 determines that abnormality is highly likely to occur in this apparatus X. Meanwhile, if an apparatus X has neither a sensor 121 satisfying the first determination condition nor a sensor 121 satisfying the second determination condition, the display control unit 15 determines that this apparatus X is in a normal state.

Furthermore, the display control unit 15 determines the state of each area, according to predetermined priorities regarding the types of the states of the respective apparatuses X that have been determined. Here, it is assumed that the state where abnormality has occurred has a higher priority than the state where abnormality is highly likely to occur. In addition, it is assumed that the state where abnormality is highly likely to occur has a higher priority than the normal state.

In this case, for example, if an area has one or more apparatuses X in which abnormality has occurred, the display control unit 15 determines that abnormality has occurred in this area. Meanwhile, if an area does not have an apparatus X in which abnormality has occurred and has one or more apparatuses X in which abnormality is highly likely to occur, the display control unit 15 determines that abnormality is highly likely to occur in this area. Meanwhile, if an area has neither an apparatus X in which abnormality has occurred nor an apparatus X in which abnormality is highly likely to occur, the display control unit 15 determines that this area is in a normal state.

Furthermore, according to the types of the states of the respective areas determined as described above, the display control unit 15 performs control of displaying the corresponding icons Ic1 in different modes. Furthermore, the management device 101 is configured to control a setting of an apparatus X that has experienced an abnormality. In one example, the management device 101 stops an operation of the apparatus X. In another example, the management device 101 adjusts and a setting of the apparatus X so the performance of the apparatus X lessens the likelihood an abnormality occurs in the area. Similarly, the management device 101 may also control a setting of the apparatus X in response to the first and second determination conditions indicating an abnormality is highly likely to occur, so as to avoid the abnormality from actually occurring. While the present description refers to controlling the display in response to the determination conditions, it should also be understood that the management device 101 may also control one or more apparatus X's in response to the determination conditions.

Specifically, as for a "second area" in which abnormality has occurred, the display control unit 15 performs control of lighting up the corresponding icon Ic1*a* in red. As for a "first area" in which abnormality is highly likely to occur, the display control unit 15 performs control of lighting up the corresponding icon Ic1*b* in yellow. As for a "third area" in the normal state, the display control unit 15 performs control of lighting up the corresponding icon Ic1*c* in blue.

In FIG. 7, the icon Ic1*a* lit in red is hatched with right-upward diagonal lines, the icon Ic1*b* lit in yellow is hatched with horizontal lines, and the icon Ic1*c* lit in blue is not hatched.

For example, when the user has moved a pointer P to a position overlapping an icon Ic1 or an area name N1 on the area screen G1 by operating a mouse, a keyboard, or the like, the display control unit 15 performs control of displaying a description pop-up S1 related to an apparatus X installed in the corresponding area, based on a plurality of pieces of determination result information stored in the storage unit 12.

Specifically, when the user has moved the pointer P to a position overlapping the icon Ic1*a*, the display control unit 15 performs control of displaying the description pop-up S1 related to one apparatus X that is selected, from among the plurality of apparatuses X installed in the "second area" corresponding to the icon Ic1*a*, according to the priorities regarding the types of the states of the respective apparatuses X.

For example, the description pop-up S1 includes: "wind-up machine" that is the name of the apparatus X which is installed in the "second area" and in which abnormality has occurred; and date and time when it was determined that the sensor 121 in this apparatus X satisfied the first determination condition.

When a plurality of apparatuses X in which abnormality has occurred are present in the area selected by the user, the display control unit 15 selects a sensor 121 that has most recently been determined to satisfy the first determination condition, from among the sensors 121 in the respective apparatuses X. Then, the display control unit 15 performs control of displaying a description pop-up S1 indicating: the name of the apparatus X in which the selected sensor 121 is disposed; and the date and time when it was determined that the sensor 121 satisfied the first determination condition.

It is assumed that, in the area selected by the user, a sensor 121 in a certain apparatus X satisfies the first determination condition while a sensor 121 in another apparatus X satisfies the second determination condition. That is, it is assumed that abnormality has occurred in the certain apparatus X while abnormality is highly likely to occur in the other apparatus X. In this case, the display control unit 15 preferentially selects the apparatus X including the sensor 121 satisfying the first determination condition, that is, the apparatus X in which abnormality has occurred, and then performs control of displaying a description pop-up S1 indicating: the name of the apparatus X; and the date and time when it was determined that the sensor 121 satisfied the first determination condition.

For example, it is assumed that, in the state where the pointer P overlaps an area name N1 or an icon Ic1 on the area screen G1, the user has performed, as the predetermined operation described above, an operation of selecting the area name N1 or the icon Ic1 by using a keyboard, a mouse, or the like. In this case, the display control unit 15 performs control of displaying, on the display device 131, an apparatus screen G2 showing an area corresponding to the area name N1 or the icon Ic1 selected by the user, and a list of apparatuses X installed in this area.

[Apparatus Screen G2]

Figure 8:
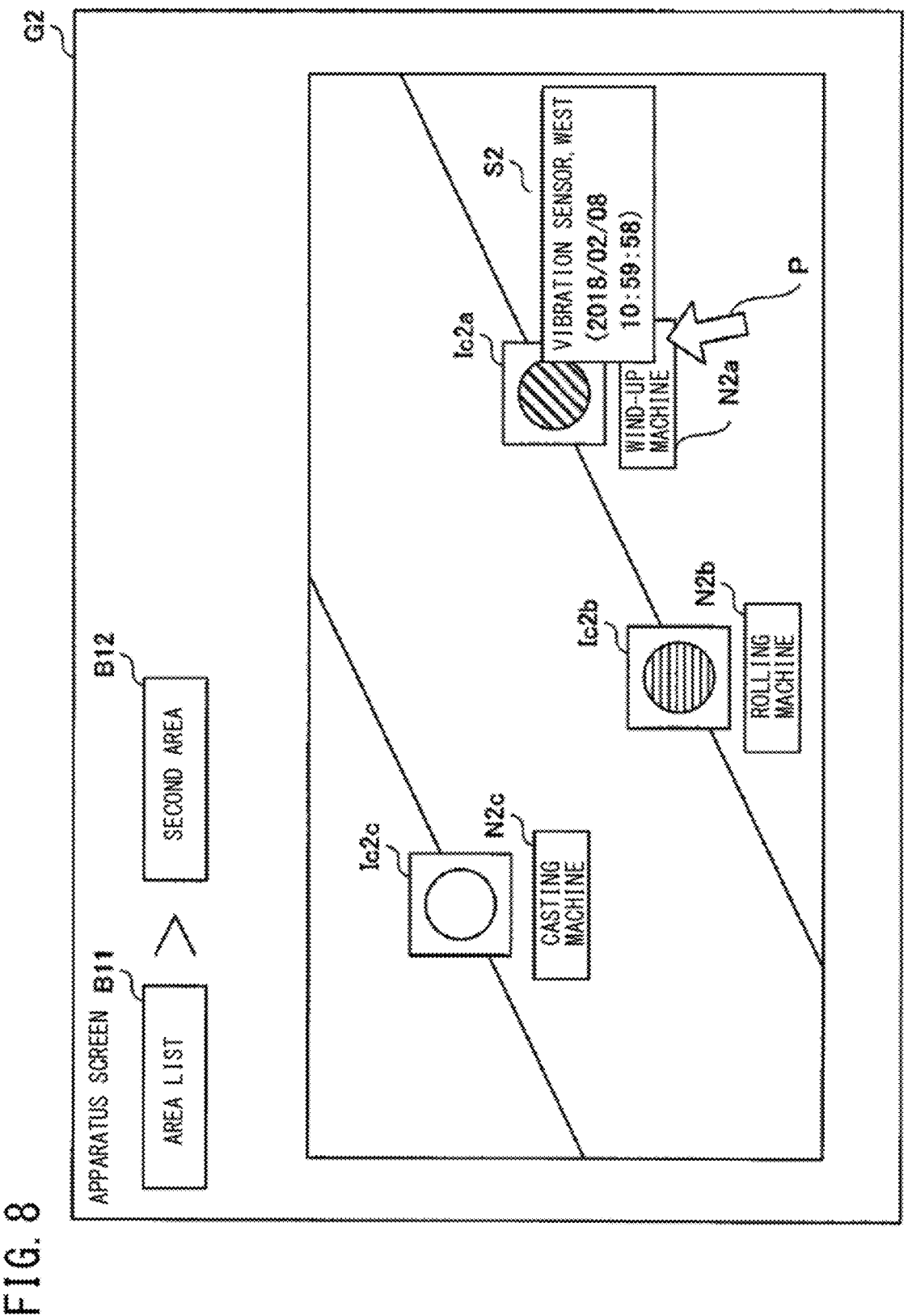
FIG. 8 shows an example of an apparatus screen displayed on the display device in the management system according to the embodiment of the present disclosure.

FIG. 8 shows an example of an apparatus screen displayed on the display device of the management system according to the embodiment of the present disclosure.

With reference to FIG. 8, it is assumed that the user has performed an operation of selecting the "second area" on the area screen G1 shown in FIG. 7. In this case, based on the apparatus information stored in the storage unit 12, the display control unit 15 performs control of displaying, on the display device 131, the apparatus screen G2 including: the "second area"; positional relationships of a plurality of apparatuses X installed in the "second area"; apparatus names N2 of the respective apparatuses X; and icons Ic2 indicating the states of the respective apparatuses X. In FIG. 8, icons Ic2*a*, Ic2*b*, and Ic2*c* are shown as examples of the icons Ic2. In FIG. 8, apparatus names N2*a*, N2*b*, and N2*c* are shown as examples of the apparatus names N2.

In more detail, according to the states of the respective apparatuses X determined as described above, the display control unit 15 performs control of displaying the corresponding icons Ic2 in different modes.

Specifically, as for the apparatus X, "wind-up machine", in which abnormality has occurred, the display control unit 15 performs control of lighting up the corresponding icon Ic2*a* in red. Meanwhile, as for the apparatus X, "rolling machine", in which abnormality is highly likely to occur, the display control unit 15 performs control of lighting up the corresponding icon Ic2*b* in yellow. Meanwhile, as for the apparatus X, "casting machine", in the normal state, the display control unit 15 performs control of lighting up the corresponding icon Ic2c in blue.

In FIG. 8, the icon Ic2a lit in red is hatched with right-upward diagonal lines, the icon Ic2b lit in yellow is hatched with horizontal lines, and the icon Ic2c lit in blue is not hatched.

For example, when the user has moved the pointer P to a position overlapping an icon Ic2 or an apparatus name N2 on the apparatus screen G2 by operating a mouse, a keyboard, or the like, the display control unit 15 performs control of displaying a description pop-up S2 related to a sensor 121 in the corresponding apparatus X, based on the plurality of pieces of determination result information stored in the storage unit 12.

Specifically, when the user has moved the pointer P to the position overlapping the icon Ic2a, the display control unit 15 performs control of displaying a description pop-up S2 related to one sensor 121 selected, from among the sensors 121 in the "wind-up machine" corresponding to the icon Ic2a overlapped by the pointer P, according to the priorities regarding the types of the states of the measurement results of the sensors 121.

The description pop-up S2 includes, for example, the sensor name, "vibration sensor, west", of the sensor 121 that is mounted on the wind-up machine and satisfies the first determination condition, and the date and time when it was determined that the sensor 121 satisfied the first determination condition.

When a plurality of sensors 121 satisfying the first determination condition are present in the apparatus X selected by the user, the display control unit 15 selects, from among these sensors 121, a sensor 121 which has most recently been determined to satisfy the first determination condition. Then, the display control unit 15 performs control of displaying a description pop-up S2 indicating: the sensor name of the selected sensor 121; and the date and time when it was determined that the sensor 121 satisfied the first determination condition.

When a certain sensor 121 satisfies the first determination condition while another sensor 121 satisfies the second determination condition in the apparatus X selected by the user, the display control unit 15 preferentially selects the sensor 121 satisfying the first determination condition, and performs control of displaying a description pop-up S2 indicating: the sensor name of the selected sensor 121; and the date and time when it was determined that this sensor 121 satisfied the first determination condition.

When a predetermined operation has been performed to the state of an apparatus X on the apparatus screen G2 by the user, the display control unit 15 performs control of displaying the sensor screen G3.

Specifically, it is assumed that, in the state where the pointer P overlaps an apparatus name N2 or an icon Ic2 on the apparatus screen G2, the user has performed, as the predetermined operation described above, an operation of selecting the apparatus name N2 or the icon Ic2 by using a keyboard, a mouse, or the like. In this case, the display control unit 15 performs control of displaying, on the display device 131, a sensor screen G3 showing a list of sensors 121 in the apparatus X corresponding to the apparatus name N2 or the icon Ic2 selected by the user.

When a predetermined operation has been performed on the apparatus screen G2, the display control unit 15 performs control of displaying the area screen G1.

Specifically, the apparatus screen G2 includes, for example, an "area list" button B11 and a "second area" button B12. When the user has performed an operation of selecting the "area list" button B11 on the apparatus screen G2, the display control unit 15 performs control of displaying the area screen G1 on the display device 131.

[Sensor Screen G3]

Figure 9:
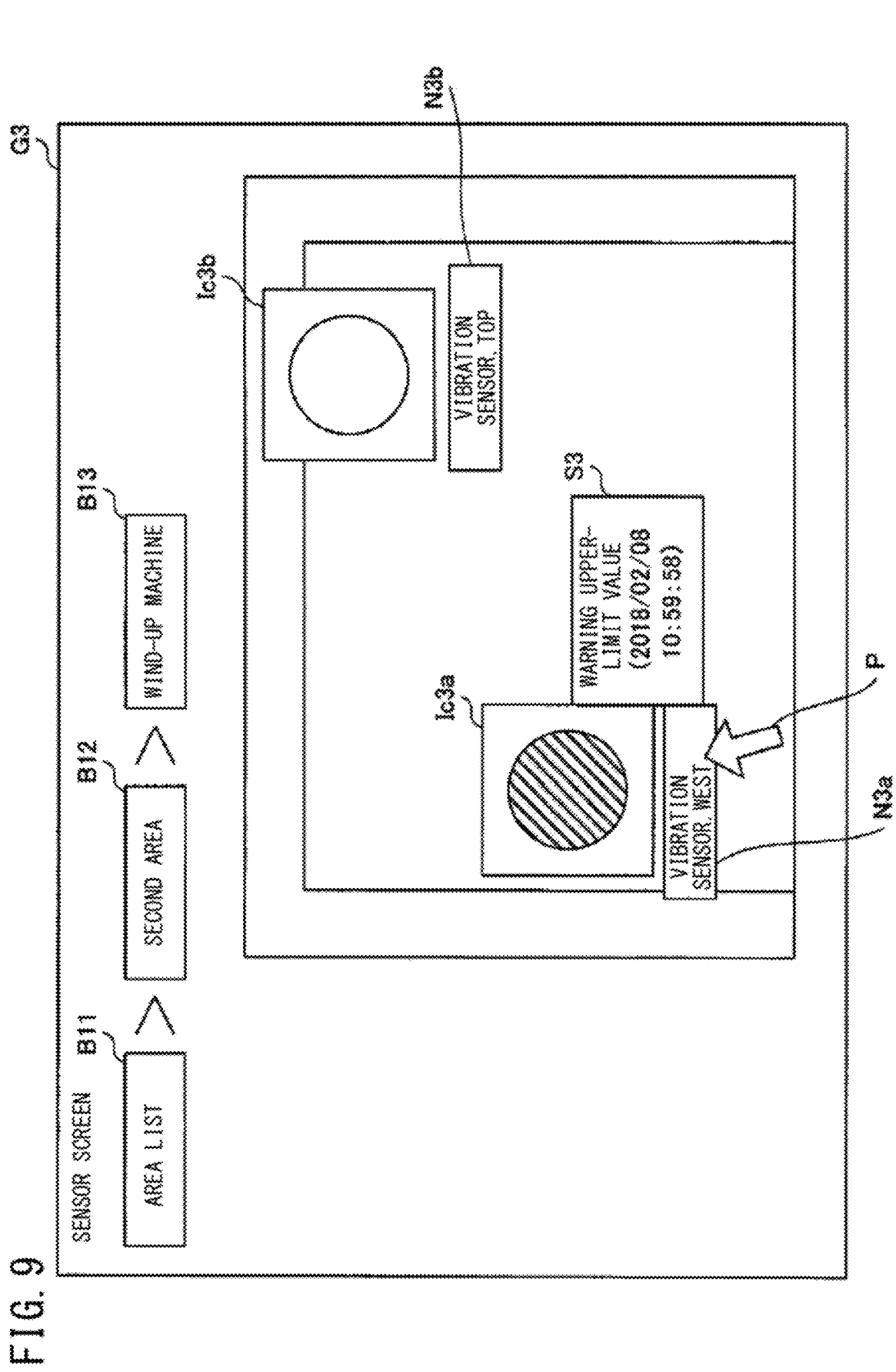
FIG. 9 shows an example of a sensor screen displayed on the display device in the management system according to the embodiment of the present disclosure.

FIG. 9 shows an example of a sensor screen displayed on the display device in the management system according to the embodiment of the present disclosure.

With reference to FIG. 9, it is assumed that the user has performed an operation of selecting the "wind-up machine" on the apparatus screen G2 shown in FIG. 8. In this case, based on the sensor information stored in the storage unit 12, the display control unit 15 performs control of displaying the sensor screen G3 including: the "wind-up machine"; a plurality of sensors 121 in the "wind-up machine"; sensor names N3 of the respective sensors 121; and icons Ic3 indicating the states of the measurement results of the respective sensors 121. In FIG. 9, icons Ic3a and Ic3b are shown as examples of the icons Ic3. In FIG. 9, sensor names N3a and N3b are shown as examples of the sensor names N3.

In more detail, based on the determination result information received from the determination unit 22, the display control unit 15 confirms the states of the measurement results of the respective sensors 121 in the "wind-up machine", and performs control of displaying the corresponding icons Ic3 in different modes, according to the types of the states confirmed.

Specifically, when the sensor 121 whose sensor name N3a is "vibration sensor, west" satisfies the first determination condition, the display control unit 15 performs control of lighting up the icon Ic3a corresponding to this sensor 121 in red. When the sensor 121 whose sensor name N3b is "vibration sensor, top" satisfies neither the first determination condition nor the second determination condition, the display control unit 15 performs control of lighting up the icon Ic3b corresponding to this sensor 121 in blue.

In FIG. 9, the icon Ic3a lit in red is hatched with right-upward diagonal lines, and the icon Ic3b lit in blue is not hatched.

For example, when the user has moved the pointer P to a position overlapping an icon Ic3 or a sensor name N3 on the sensor screen G3 by operating a mouse, a keyboard, or the like, the display control unit 15 performs control of displaying a description pop-up S3 related to the corresponding sensor 121, based on the determination result information received from the determination unit 22.

Specifically, when the user has moved the pointer P to the position overlapping the icon Ic3a, the display control unit 15 performs control of displaying a description pop-up S3 indicating that at least one of a plurality of values obtained through a statistical process performed on a plurality of pieces of sensor data from the sensor 121, "vibration sensor, west", corresponding to the icon Ic3a is greater than the warning upper-limit value W1, and indicating the date and time when it was determined that this sensor 121 satisfied the first determination condition.

For example, in the case where it was determined a plurality of times that the sensor 121 satisfied the first determination condition, the display control unit 15 performs control of displaying a description pop-up S3 indicating the latest date and time when it was determined that the sensor 121 satisfied the first determination condition.

For example, it is assumed that, in the state where the pointer P overlaps a sensor name N3 or an icon Ic3 on the sensor screen G3, the user has performed, as the predetermined operation described above, an operation of selecting the sensor name N3 or the icon Ic3 by using a keyboard, a mouse, or the like. In this case, the display control unit 15 performs control of displaying, on the display device 131, a graph display screen G4 showing time-series changes in the measurement results of the sensor 121 corresponding to the sensor name N3 or the icon Ic3 selected by the user.

When a predetermined operation has been performed on the sensor screen G3, the display control unit 15 performs control of displaying the apparatus screen G2 or the area screen G1 on the display device 131.

Specifically, the sensor screen G3 includes, for example, an "area list" button B11, a "second area" button B12, and a "wind-up machine" button B13. When the user has performed an operation of selecting the "second area" button B12, the display control unit 15 performs control of displaying the apparatus screen G2. When the user has performed an operation of selecting the "area list" button B11, the display control unit 15 performs control of displaying the area screen G1.

[Graph Display Screen G4]

Figure 10:
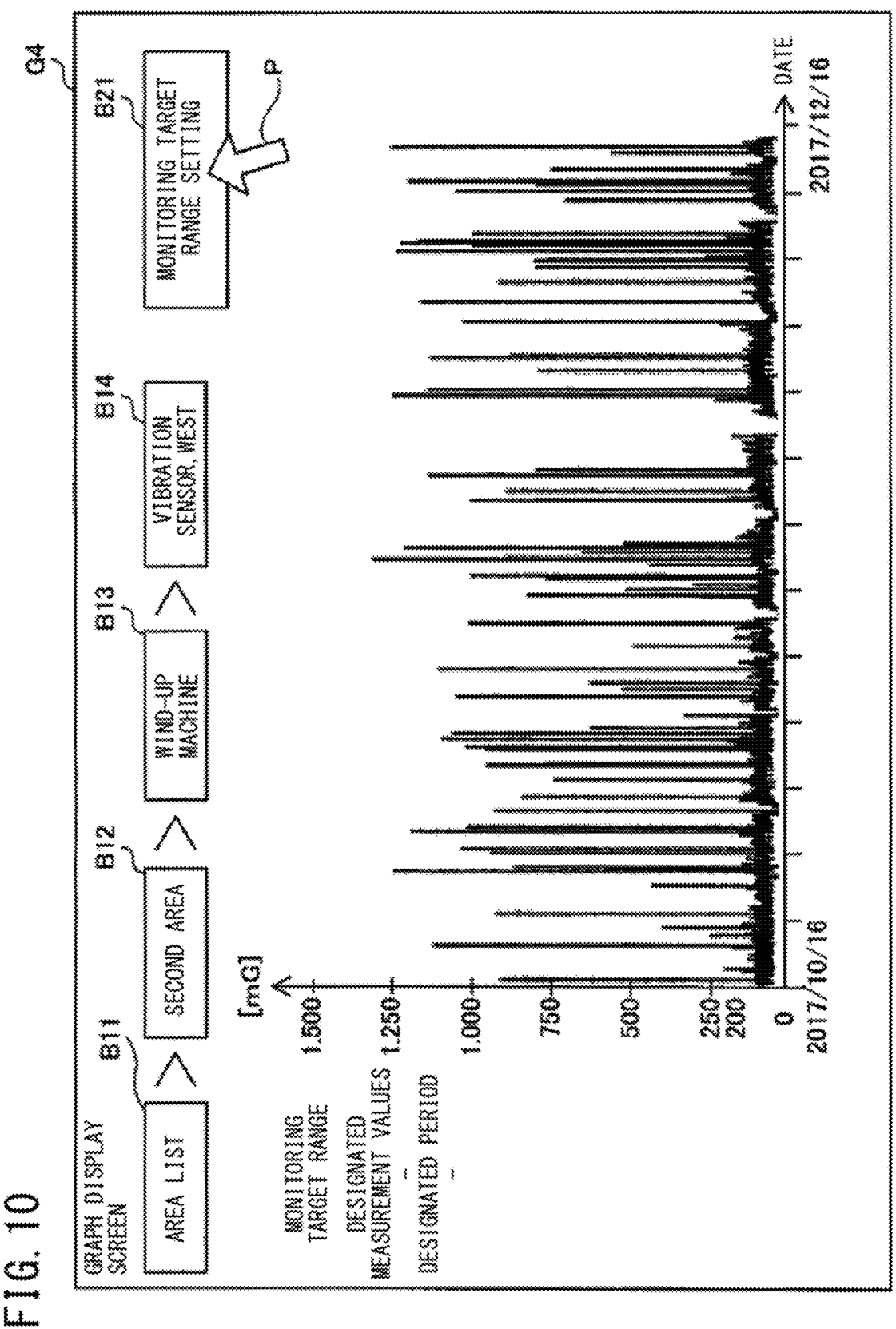
FIG. 10 shows an example of a graph display screen displayed on the display device in the management system according to the embodiment of the present disclosure.

FIG. 10 shows an example of a graph display screen displayed on the display device in the management system according to the embodiment of the present disclosure.

With reference to FIG. 10, it is assumed that the user has performed an operation of selecting the "vibration sensor, west" on the sensor screen G3. In this case, the display control unit 15 performs control of displaying the graph display screen G4 including a graph indicating time-series changes in the measurement results of the "vibration sensor, west".

At this time, if the sensor 121 selected by the user satisfies the first determination condition, the display control unit 15 performs control of displaying the graph in a mode according to the state of the measurement result of the sensor 121, such as lighting up the graph on the graph display screen G4.

When a predetermined operation has been performed on the graph display screen G4, the display control unit 15 performs control of displaying the sensor screen G3, the apparatus screen G2, or the area screen G1.

Specifically, the graph display screen G4 includes, for example, an "area list" button B11, a "second area" button B12, a "wind-up machine" button B13, and a "vibration sensor, west" button B14.

When the user has performed an operation of selecting the "wind-up machine" button B13, the display control unit 15 performs control of displaying the sensor screen G3 on the display device 131. When the user has performed an operation of selecting the "second area" button B12, the display control unit 15 performs control of displaying the apparatus screen G2. When the user has performed an operation of selecting the "area list" button B11, the display control unit 15 performs control of displaying the area screen G1.

In addition, the graph display screen G4 includes a "monitoring target range setting" button B21. When the user has performed an operation of selecting the "monitoring target range setting" button B21, the display control unit 15 performs control of displaying the range setting screen G5 on the display device 131.

[Range Setting Screen G5]

Figure 11:
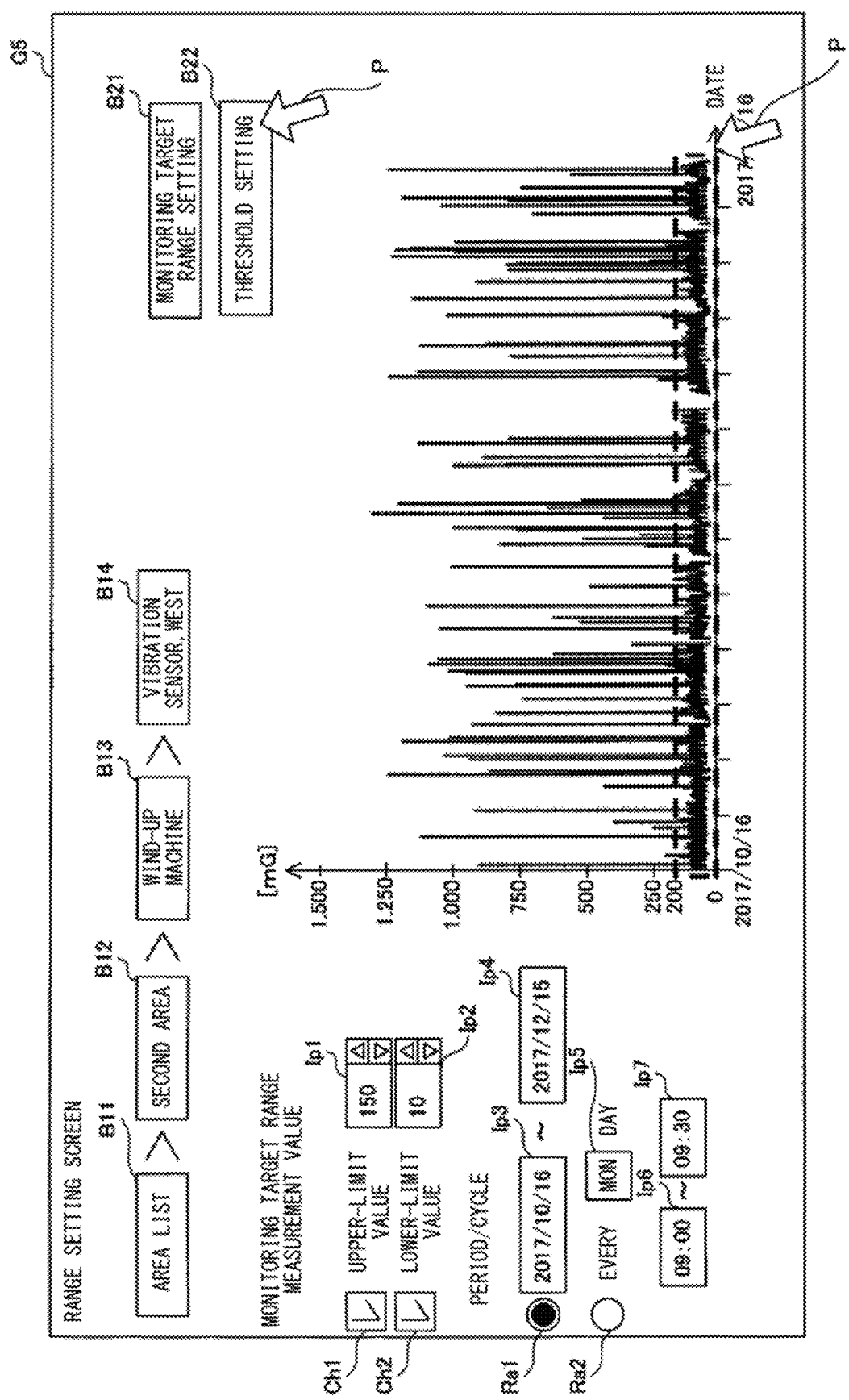
FIG. 11 shows an example of a range setting screen displayed on the display device in the management system according to the embodiment of the present disclosure.

FIG. 11 shows an example of a range setting screen displayed on the display device in the management system according to the embodiment of the present disclosure.

With reference to FIG. 11, for example, the range setting screen G5 includes: check boxes Ch1, Ch2 for selecting whether or not to set an upper-limit value and a lower-limit value of measurement values within a monitoring target range R, respectively; an upper-limit input box Ip1 used for setting an upper-limit value; and a lower-limit input box Ip2 used for setting a lower-limit value.

For example, when setting an upper-limit value of the measurement values, the user checks the check box Ch1, and performs an operation of inputting an arbitrary value in the input box Ip1. When setting a lower-limit value of the measurement values, the user checks the check box Ch2, and performs an operation of inputting an arbitrary value in the input box Ip2.

The range setting screen G5 includes: radio buttons Ra1, Ra2 for designating a method of setting a period as a monitoring target range R; an input box Ip3 for date and time to start the period; an input box Ip4 for date and time to end the period; and an input box Ip5 for day of week, an input box Ip6 for start time, and an input box Ip7 for end time, which are used for setting of cyclic periods.

The user can arbitrarily set a monitoring target range R, for each sensor 121, according to the measurement target of the sensor 121, the operating state of the apparatus X including the sensor 121, etc., while viewing the graph showing the time-series changes in the measurement results of the sensor 121 included in the range setting screen G5. Likewise, control operations may be saved in advance and automatically dispatched to control an apparatus X if the target range R is exceeded (or deviates from by a predetermined amount).

The user may set a monitoring target range R by performing an operation of selecting, by dragging, an arbitrary range in the graph showing time-series changes in the measurement results of the sensor 121, instead of performing input to the input boxes Ip1 to Ip7. For example, the user can set the monitoring target range R through an operation as follows. That is, using a pointing device such as a mouse, the user presses down a left click button thereof with the pointer P being positioned at a corner of an arbitrary rectangular range, moves the pointer P to another corner on a diagonal line with respect to the aforementioned corner of the rectangular range while keeping the left click button pressed down, and releases the left click button.

When using a touch panel, the user can set a monitoring target range R through an operation as follows. That is, for example, the user touches a corner of an arbitrary rectangular range on the touch panel, moves the finger to another corner on a diagonal line with respect to the aforementioned corner of the rectangular range while touching the touch panel, and releases the finger from the touch panel.

When setting a range of measurement values as a monitoring target range R, the user may set one of the upper-limit value and the lower-limit value.

When a predetermined operation has been performed on the range setting screen G5, the display control unit 15 performs control of displaying the graph display screen G4. Specifically, the range setting screen G5 includes an "area list" button B11, a "second area" button B12, a "wind-up machine" button B13, and a "vibration sensor, west" button B14. When the user performs an operation of selecting the "vibration sensor, west" button B14, the display control unit 15 performs control of displaying the graph display screen G4 on the display device 131.

Figure 12:
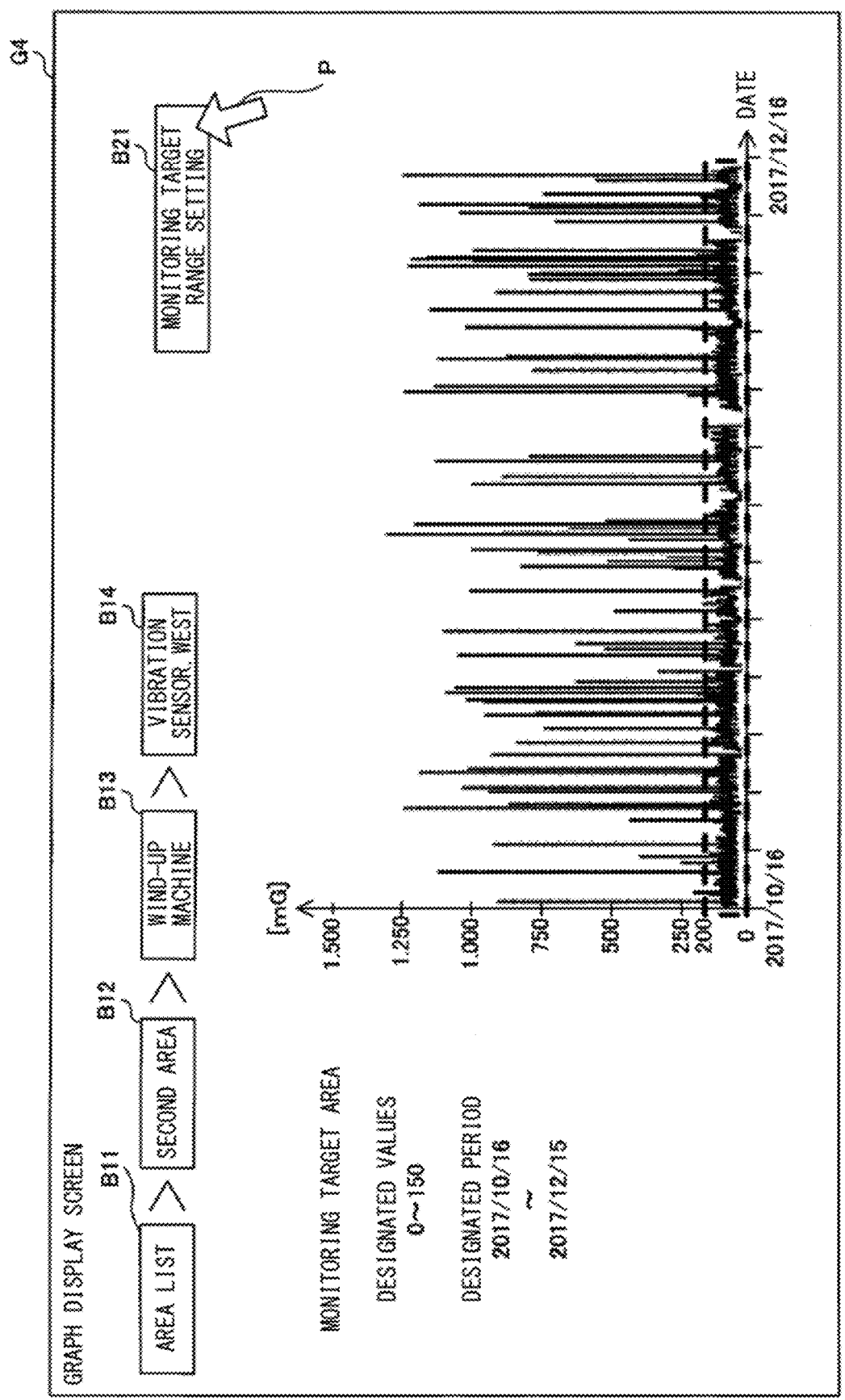
FIG. 12 shows an example of a graph display screen after a monitoring target range has been set, displayed on the display device according to the embodiment of the present disclosure.

FIG. 12 shows an example of the graph display screen, after a monitoring target range has been set, which is displayed on the display device according to the embodiment of the present disclosure.

With reference to FIG. 12, it is assumed that the user sets, as a monitoring target range R, a range of measurement values and a continuous period. In this case, for example, on the graph display screen G4, the display control unit 15 performs control of displaying a frame indicating the monitoring target range R on the graph showing time-series changes in the measurement results.

Figure 13:
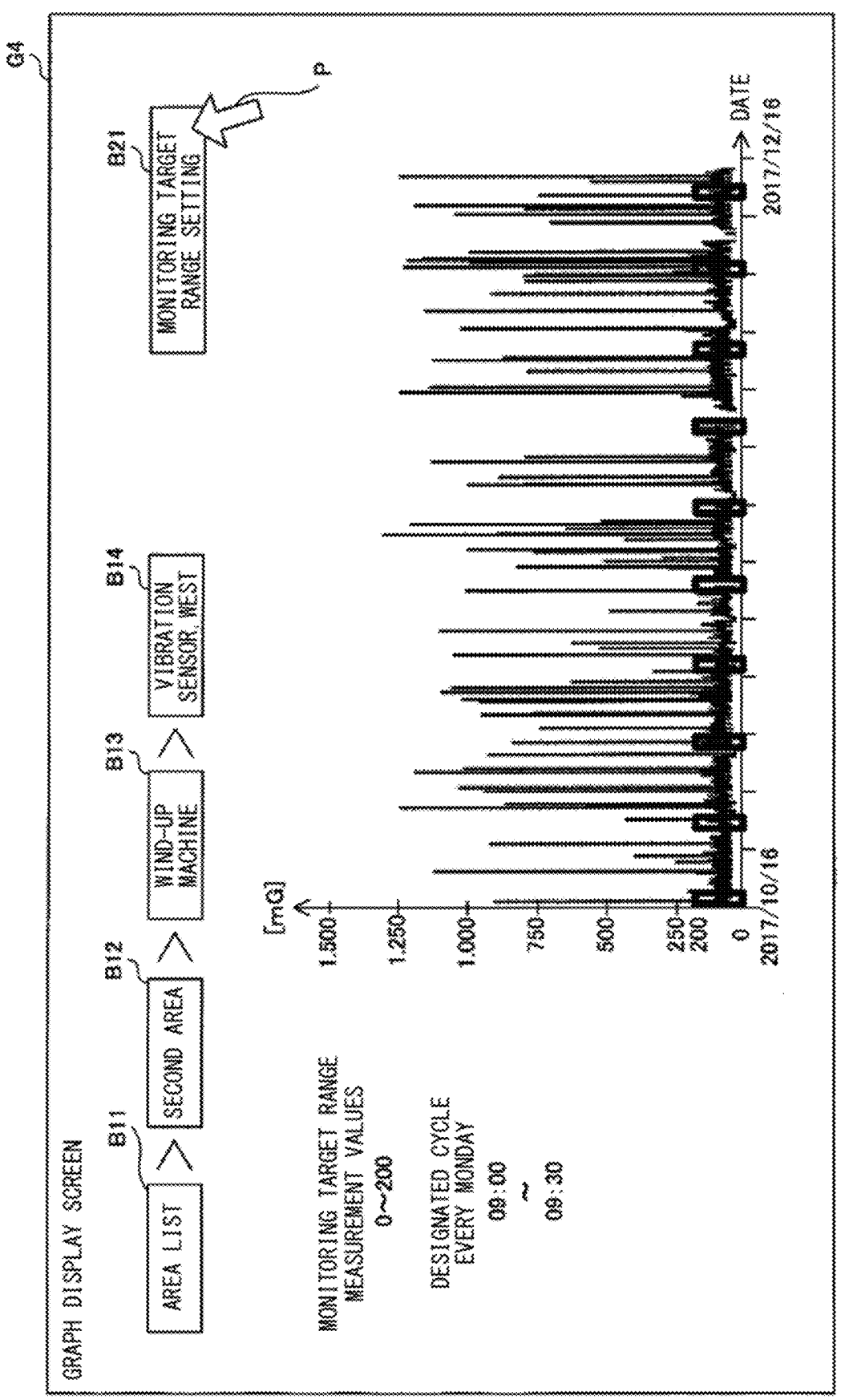
FIG. 13 shows an example of a graph display screen after a monitoring target range has been set, displayed on the display device according to the embodiment of the present disclosure.

FIG. 13 shows an example of the graph display screen, after a monitoring target range has been set, which is displayed on the display device according to the embodiment of the present disclosure.

With reference to FIG. 13, it is assumed that the user sets, as a monitoring target range R, a range of measurement values and cyclic periods. In this case, for example, on the graph display screen G4, the display control unit 15 performs control of displaying a plurality of frames respectively indicating a plurality of monitoring target ranges R on the graph showing time-series changes in the measurement results.

Referring back to FIG. 11, the user may be allowed to select both the content of the radio button Ra1 and the content of the radio button Ra2.

For example, it is assumed that the user performs an operation of selecting both the contents described above, and inputs "2017/10/16" in the input box Ip3, "2017/12/15" in the input box Ip4, "Monday" in the input box Ip5, "9:00" in the input box Ip6, and "9:30" in the input box Ip7. In this case, the monitoring target range R becomes a period from 9:00 to 9:30 every Monday from 2017/10/16 to 2017/12/15.

When a predetermined operation has been performed on the range setting screen G5, the display control unit 15 performs control of displaying the threshold setting screen G6. Specifically, the range setting screen G5 includes a "monitoring target range setting" button B21 and a "threshold setting" button B22. When the user has performed an operation of selecting the "threshold setting" button B22, the display control unit 15 performs control of displaying the threshold setting screen G6 on the display device 131.

[Threshold Setting Screen G6]

(Setting of Threshold Value Regarding Statistical Process)

Figure 14:
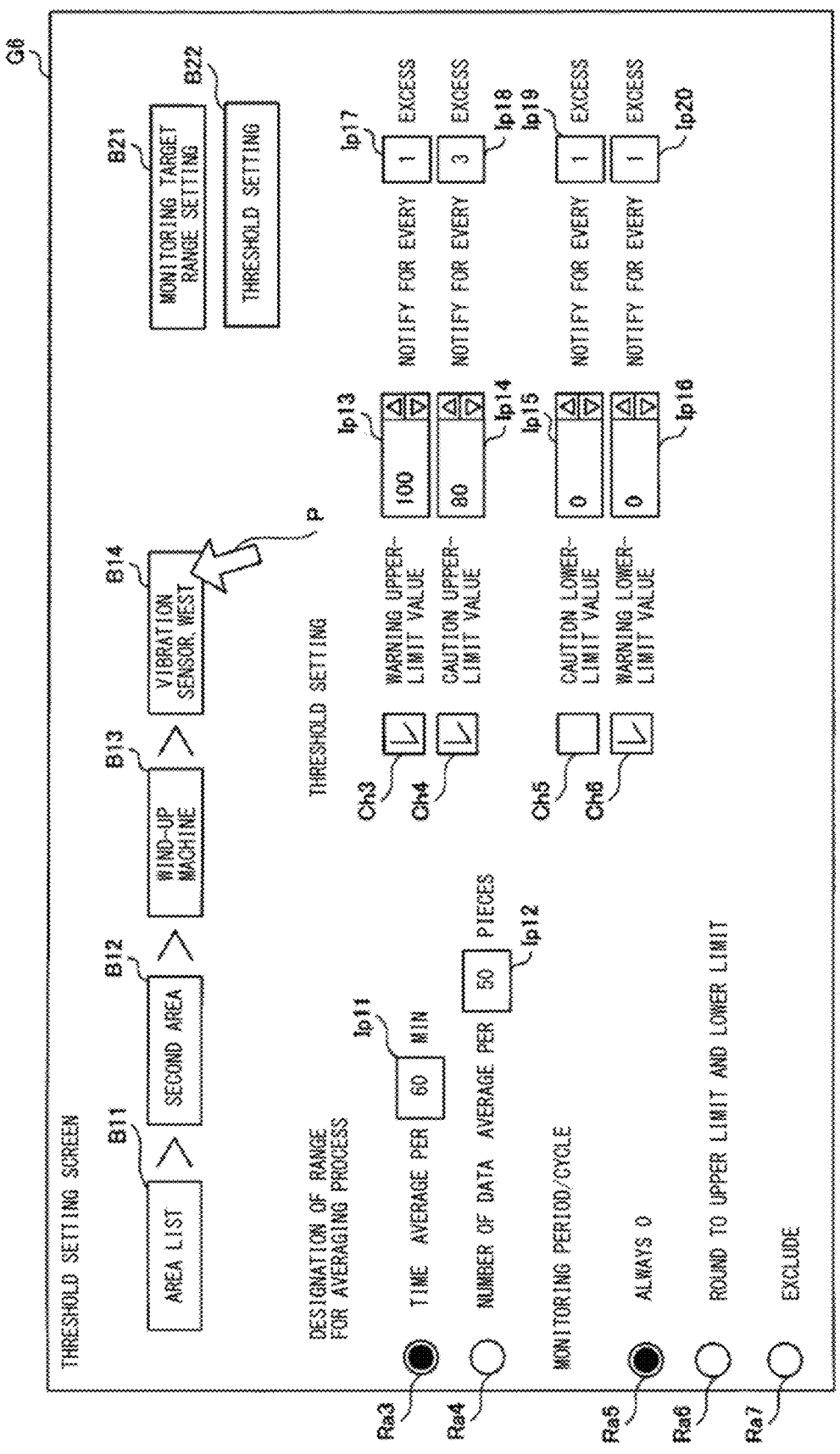
FIG. 14 shows an example of a threshold setting screen displayed on the display device in the management system according to the embodiment of the present disclosure.

FIG. 14 shows an example of a threshold setting screen displayed on the display device of the management system according to the embodiment of the present disclosure.

With reference to FIG. 14, for example, the threshold setting screen G6 includes: radio buttons Ra3 and Ra4 for designating a method for an averaging process; and an input box Ip11 for time and an input box Ip12 for number of pieces of data, which are used for the averaging process.

For example, it is assumed that the user selects the radio button Ra3 and inputs "60" in the input box Ip11. In this case, in the sensor data averaging process, the calculation unit 21 shown in FIG. 1 divides the monitoring target range R at an interval of 60 minutes to obtain divided periods, and calculates, for each divided period, an average value of the measurement results indicated by a plurality of pieces of sensor data.

For example, it is assumed that the user selects the radio button Ra4, and inputs "50" in the input box Ip12. In this case, in the sensor data averaging process, the calculation unit 21 divides a plurality of pieces of sensor data acquired in the monitoring target range R into a plurality of sets, each having 50 pieces of data, in chronological order from sensor data with the earliest measurement timing. Then, the calculation unit 21 calculates, for each set, an average value of the measurement results of the 50 pieces of sensor data.

The threshold setting screen G6 is a screen for receiving a setting of a method for processing the aforementioned extra-range data, i.e., sensor data not included in the intra-range data. Specifically, the threshold setting screen G6 includes radio buttons Ra5 to Ra7 used for a setting related to measurement results (hereinafter referred to as "outliers") not included in the range of the measurement results as the monitoring target range R.

When the user has performed an operation of selecting the radio button Ra5, the calculation unit 21 changes the outliers to zero in the averaging process. When the user has performed an operation of selecting the radio button Ra6, the calculation unit 21, in the averaging process, changes the measurement values greater than the upper-limit value of the range of the measurement values to the upper-limit value, and changes the measurement values smaller than the lower-limit value of the range to the lower-limit value. When the user has performed an operation of selecting the radio button Ra7, the calculation unit 21 eliminates the outliers in the averaging process.

(Setting of Threshold Values Related to Determination Process)

The threshold setting screen G6 includes check boxes Ch3 to Ch6 which are check boxes used for setting threshold values related to the determination process of the determination unit 22, specifically, for designating the warning upper-limit value W1, the caution upper-limit value A1, the caution lower-limit value A2, and the warning lower-limit value W2, respectively.

The threshold setting screen G6 further includes input boxes Ip13 to Ip16 in which the warning upper-limit value W1, the caution upper-limit value A1, the caution lower-limit value A2, and the warning lower-limit value W2 are inputted, respectively.

The threshold setting screen G6 further includes an input box Ip17 in which the number of times the measurement result of the sensor 121 exceeds the warning upper-limit value W1 is inputted, and an input box Ip18 in which the number of times the measurement result of the sensor 121 exceeds the caution upper-limit value A1 is inputted, which are conditions for the determination unit 22 to perform predetermined outputs.

The threshold setting screen G6 includes an input box Ip19 in which the number of times the measurement result of the sensor 121 exceeds the caution lower-limit value A2 is inputted, and an input box Ip20 in which the number of times the measurement result of the sensor 121 exceeds the warning lower-limit value W2 is inputted, which are conditions for the determination unit 22 to perform a predetermined output.

For example, the user selects the check box Ch3, and inputs arbitrary values in the input box Ip13 and the input box Ip17. In this case, in the determination process, the determination unit 22 determines that abnormality has occurred in the sensor 121 when the number of times the measurement result exceeds the value inputted in the input box Ip13 reaches the number of times inputted in the input box Ip17.

For example, the user selects the check box Ch4, and inputs arbitrary values in the input box Ip14 and the input box Ip18. In this case, in the determination process, the determination unit 22 determines that abnormality is highly likely to occur in the sensor 121 when the number of times the measurement result exceeds the value inputted in the input box Ip14 reaches the number of times inputted in the input box Ip18.

For example, the user selects the check box Ch5, and inputs arbitrary values in the input box Ip15 and the input box Ip19. In this case, in the determination process, the determination unit 22 determines that abnormality is highly likely to occur in the sensor 121 when the number of times the measurement result becomes smaller than the value inputted in the input box Ip15 reaches the number of times inputted in the input box Ip19.

For example, the user selects the check box Ch6, and inputs arbitrary values in the input box Ip16 and the input box Ip20. In this case, in the determination process, the determination unit 22 determines that abnormality has occurred in the sensor 121 when the number of times the measurement result becomes smaller than the value inputted in the input box Ip16 reaches the number of times inputted to the input box Ip20.

The user may set all of the warning upper-limit value W1, the caution upper-limit value A1, the caution lower-limit value A2, and the warning lower-limit value W2, or may set some of the warning upper-limit value W1, the caution upper-limit value A1, the caution lower-limit value A2, and the warning lower-limit value W2.

<Operation Flow>

The management device 101 includes a computer, and an arithmetic processing unit such as a CPU in the computer reads out a program including a part or all of steps in the following flowchart from a memory (not shown), and executes the program. The program for this device can be installed from outside. The program for this apparatus is distributed in a state of being stored in a storage medium.

Figure 15:
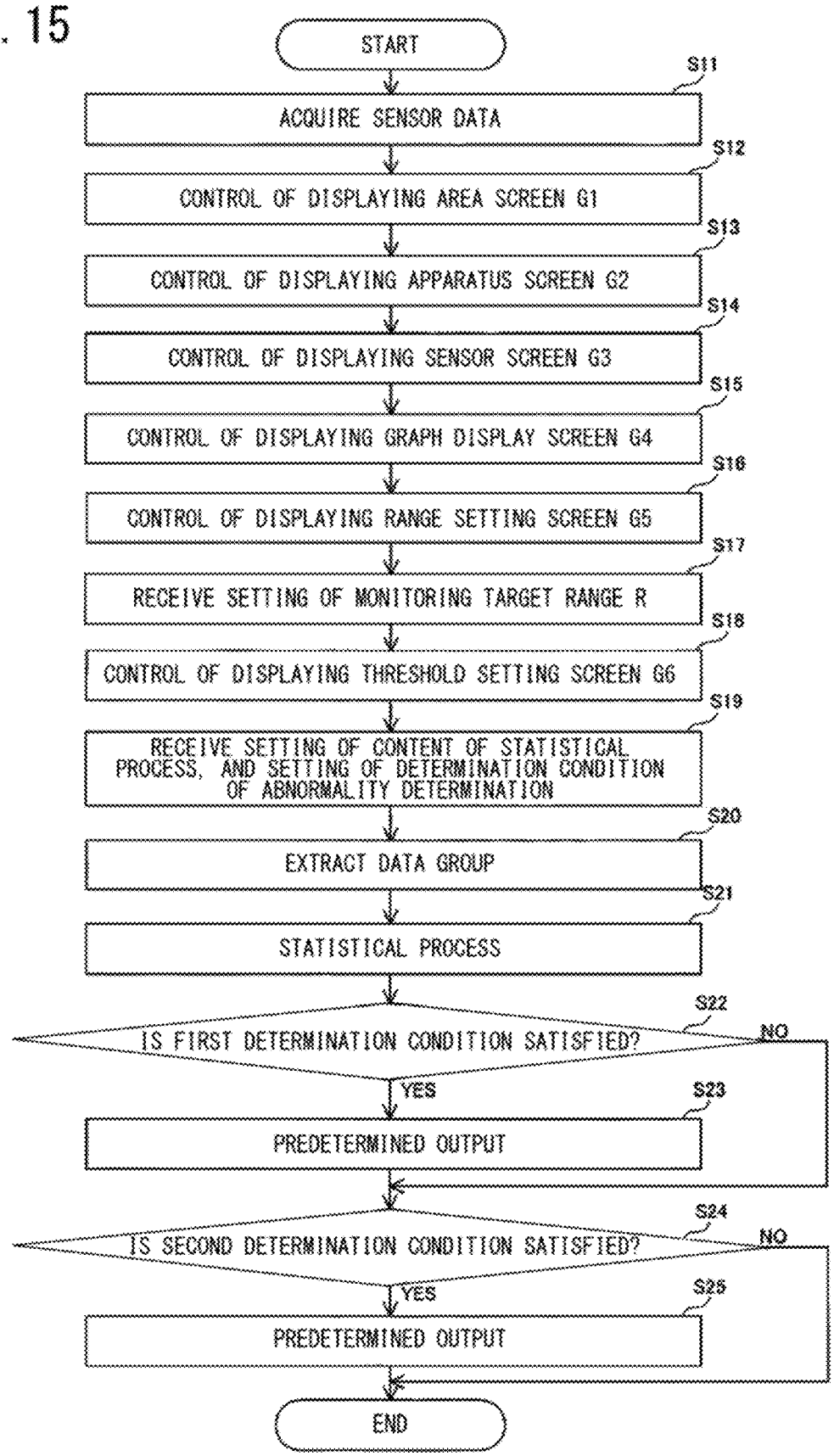
FIG. 15 shows a flowchart of an operation procedure of the management device according to the embodiment of the present disclosure.

FIG. 15 is a flowchart of an operation procedure of the management device according to the embodiment of the present disclosure.

With reference to FIG. 15, first, the acquisition unit 11 acquires sensor data transmitted from each sensor 121, and stores the acquired sensor data in the storage unit 12 (step S11).

Next, for example, when a predetermined operation has been performed by the user, the display control unit 15 performs control of displaying the area screen G1 on the display device 131 (step S12).

Next, for example, when an operation of selecting one area is performed on the area screen G1 by the user, the display control unit 15 performs control of displaying, on the display device 131, the apparatus screen G2 indicating this area and a list of apparatuses X installed in this area (step S13).

Next, for example, when an operation of selecting one apparatus X is performed on the apparatus screen G2 by the user, the display control unit 15 performs control of displaying, on the display device 131, the sensor screen G3 indicating this apparatus X and a list of sensors 121 in the apparatus X (step S14).

Next, for example, when an operation of selecting one sensor 121 is performed on the sensor screen G3 by the user, the display control unit 15 performs control of displaying, on the display device 131, the graph display screen G4 indicating time-series changes in the measurement results of the sensor 121, based on the plurality of pieces of sensor data stored in the storage unit 12 (step S15).

Next, when a predetermined operation is performed on the graph display screen G4 by the user, the display control unit 15 performs control of displaying, on the display device 131, the range setting screen G5 that receives a setting of a monitoring target range R (step S16).

Next, the input reception unit 16 receives an input of the setting content of the monitoring target range R by the user, and stores setting information indicating the setting content in the storage unit 12 (step S17).

Next, for example, when a predetermined operation is performed on the range setting screen G5 by the user, the display control unit 15 performs control of displaying, on the display device 131, the threshold setting screen G6 that receives a setting of a method for a statistical process and a setting of a determination condition of abnormality determination (step S18).

Next, the input reception unit 16 receives the inputs, by the user, of the setting content of the method for the statistical process and the setting content of the determination condition of abnormality determination, and stores setting information indicating the setting contents into the storage unit 12 (step S19).

Next, based on the setting information stored in the storage unit 12, the extraction unit 13 extracts, from among a plurality of pieces of sensor data, a data group including intra-range data included in the monitoring target range R, and outputs the extracted data group to the calculation unit 21 (step S20).

Upon receiving the data group from the extraction unit 13, the calculation unit 21 performs the statistical process for the data group, based on the setting information stored in the storage unit 12, and outputs processing result information indicating the result of the statistical process to the determination unit 22 (step S21).

Next, based on the processing result information received from the calculation unit 21 and on the setting information stored in the storage unit 12, the determination unit 22 determines whether or not the measurement result of the sensor 121 satisfies the first determination condition of abnormality determination (step S22).

When the measurement result of the sensor 121 satisfies the first determination condition (YES in step S22), the determination unit 22 performs a predetermined output. For example, the determination unit 22 notifies the user that abnormality has occurred in the apparatus X including the sensor 121, by e-mail or the like (step S23).

On the other hand, when the measurement result of the sensor 121 does not satisfy the first determination condition (NO in step S22), the determination unit 22 determines whether or not the measurement result satisfies the second determination condition (step S24).

When the measurement result of the sensor 121 satisfies the second determination condition (YES in step S24), the determination unit 22 performs a predetermined output. For example, the determination unit 22 notifies the user that abnormality is highly likely to occur in the apparatus X including the sensor 121, by e-mail or the like (step S25).

In FIG. 15, control of displaying the range setting screen G5 by the display control unit 15 (step S16), reception of input of the setting content of the monitoring target range R by the input reception unit 16 (step S17), control of displaying the threshold setting screen G6 by the display control unit 15 (step S18), and reception of input of the setting contents of the method for the statistical process and the determination condition of abnormality determination by the input reception unit 16 (step S19) may be performed before acquisition of the sensor data by the acquisition unit 11 (step S11).

As described above, in the management device 101 according to the embodiment of the present disclosure, for example, preservation of apparatuses can be optimized in production site. In addition, since trend monitoring for each apparatus X is automated, for example, removal of noise or the like from the measurement result of each sensor 121 need not be manually performed, and therefore, the user is less likely to be required to have highly specialized knowledge. In addition, a large amount of sensor data can be easily processed. Consequently, various costs can be reduced.

When monitoring of an apparatus is performed based on a measurement result of a sensor, a technique of eliminating unnecessary information such as noise from the measurement result is desired for more appropriate monitoring.

Meanwhile, in the management device 101 according to the embodiment of the present disclosure, the acquisition unit 11 acquires sensor data indicating measurement results of one or a plurality of sensors 121. The display control unit 15 performs control of displaying the range setting screen G5 which receives a setting of a monitoring target range R regarding the measurement values, and the threshold setting screen G6 which receives a setting of a determination condition of abnormality determination. The calculation unit 21 performs a statistical process for a data group including intra-range data, i.e., the sensor data included in the monitoring target range R, out of the sensor data acquired by the acquisition unit 11. When the result of the statistical process performed by the calculation unit 21 satisfies the determination condition, the determination unit 22 performs a predetermined output.

As described above, since the setting of the monitoring target range R and the setting of the determination condition of the abnormality determination are received, appropriate abnormality determination can be performed according to the measurement targets of the sensors 121, etc. Furthermore, since the data group including the intra-range data is subjected to the statistical process, more appropriate abnormality determination can be performed by use of the data group in which variations in the measurement values, etc., are suppressed, as compared to the case where abnormality determination is performed by use of a plurality of pieces of sensor data as they are.

Therefore, in the management device 101 according to the embodiment of the present disclosure, monitoring of apparatuses X based on the measurement results of sensors 121 can be performed more appropriately.

In the management device 101 according to the embodiment of the present disclosure, the display control unit 15 performs control of displaying the range setting screen G5 which receives a setting of a monitoring target range regarding a period. The calculation unit 21 performs a statistical process for a data group including intra-range data, i.e., sensor data included in the monitoring target range R regarding the measurement values and included in the monitoring target range R regarding the period, out of the sensor data acquired by the acquisition unit 11.

As described above, since not only the setting regarding the measurement values but also the setting of the monitoring target range R regarding the period are received, appropriate abnormality determination can be performed even if the operating state of the apparatus X varies depending on the period, for example.

In the management device 101 according to the embodiment of the present disclosure, on the range setting screen G5, cyclic periods can be set as the aforementioned period.

With this configuration, appropriate abnormality determination can be performed for an apparatus X whose operating state or the like changes in cycles.

In the management device 101 according to the embodiment of the present disclosure, the display control unit 15 further performs control of displaying the threshold setting screen G6 which receives a setting of a method for processing extra-range data that are sensor data not included in the intra-range data. Then, the calculation unit 21 performs a statistical process for a data group in which a processing result of the extra-range data obtained by the set processing method is added to the intra-range data.

With this configuration, more appropriate abnormality determination can be performed by use of the data group including the extra-range data having been subjected to the desired process.

In the management device 101 according to the embodiment of the present disclosure, the display control unit 15 further performs control of displaying the sensor screen G3 which shows an apparatus X and the states of measurement results of a plurality of sensors 121 mounted on the apparatus X. On the sensor screen G3, the display control unit 15 displays the states of the measurement results of the sensors 121 in different modes, according to whether or not the corresponding sensor data satisfy the determination condition of abnormality determination. When a predetermined operation is performed to the state of the measurement result of a sensor 121 on the sensor screen G3, the display control unit 15 displays at least one of the range setting screen G5 regarding the intra-range data and the threshold setting screen G6 regarding the determination condition, or displays the graph display screen G4 for transition to the range setting screen G5 or the threshold setting screen G6.

With this configuration, when the user confirms the sensor screen G3, the user can easily visually grasp the states of the measurement results of the respective sensors 121. In addition, the user can arbitrarily select one sensor 121 while grasping the states of the measurement results of the respective sensors 121, and cause the range setting screen G5, the threshold setting screen G6, or the graph display screen G4 corresponding to the selected sensor 121 to be displayed.

In the management device 101 according to the embodiment of the present disclosure, the display control unit 15 further performs control of displaying the apparatus screen G2 which shows an area and the states of a plurality of apparatuses X installed in the area. The display control unit 15 determines the state of the apparatus X on the apparatus screen G2, according to predetermined priorities regarding the types of the states, among the states of the measurement results of the respective sensors 121 in the apparatus X. Then, the display control unit 15 displays the sensor screen G3 when a predetermined operation has been performed to the state of the apparatus X on the apparatus screen G2.

With this configuration, for example, the state of an apparatus X, which has higher priority for notification to the user, can be displayed on the apparatus screen G2. In addition, the user can arbitrarily select one apparatus X while grasping the states of the respective apparatuses X, and cause the sensor screen G3 corresponding to the selected apparatus X to be displayed.

In the management device 101 according to the embodiment of the present disclosure, the display control unit 15 performs control of displaying the apparatus screen G2 which further shows the contents regarding the sensors 121 mounted on the apparatus X. When a plurality of results of the statistical process corresponding to the plurality of sensors 121 mounted on the apparatus X satisfy the determination condition, the display control unit 15 selects, out of the plurality of sensors 121, a sensor 121 corresponding to the result of the statistical process which has most recently been determined to satisfy the determination condition, and then the display control unit 15 performs control of displaying the apparatus screen G2 which shows the content regarding the selected sensor 121.

For example, as for a first sensor 121 and a second sensor 121 mounted on the same apparatus X, it is assumed that the result of the statistical process corresponding to the first sensor 121 is firstly determined to satisfy the determination condition and thereafter the result of the statistical process corresponding to the second sensor 121 is determined to satisfy the determination result. In this case, in the apparatus X, a period during which a second portion corresponding to the second sensor 121 was normally operated, is included in a period during which abnormality occurs in a first portion corresponding to the first sensor 121. That is, the second portion is highly likely to be normalized even when abnormality occurs in the first portion, and therefore, the second portion is highly needed to be restored to the normal state, as compared to the first portion.

As described above, a sensor 121, which has most recently been determined to satisfy the determination condition, is selected, and control of displaying the content regarding the selected sensor 121 is performed. Therefore, more effective notification can be performed on the apparatus screen G2.

In the management device 101 according to the embodiment of the present disclosure, the display control unit 15 further performs control of displaying the area screen G1 which shows the states of a plurality of areas. The display control unit 15 determines the states of the areas on the area screen G1, according to predetermined priorities regarding the types of the states of apparatuses X, among the states of the apparatuses X in the area. Then, when a predetermined operation has been performed to the state of the area on the area screen G1, the display control unit 15 displays the apparatus screen G2.

With this configuration, for example, the state of an area, which has a higher priority for notification to the user, can be displayed on the area screen G1. In addition, the user can arbitrarily select one area while grasping the states of the respective areas, and cause the apparatus screen G2 corresponding to the selected area to be displayed.

In the management method according to the embodiment of the present disclosure, the acquisition unit 11 firstly acquires sensor data indicating the measurement results of one or a plurality of sensors. Next, the display control unit 15 performs control of displaying the range setting screen G5 which receives a setting of a monitoring target range R regarding measurement values. Next, the display control unit 15 performs control of displaying the threshold setting screen G6 which receives a setting of a determination condition of abnormality determination. Next, the calculation unit 21 performs a statistical process for a data group including intra-range data that are the sensor data included in the monitoring target range R, out of the sensor data acquired by the acquisition unit 11. Next, when the result of the statistical process performed by the calculation unit 21 satisfies the determination condition, the determination unit 22 performs a predetermined output.

As described above, since the setting of the monitoring target range R and the setting of the determination condition of the abnormality determination are received, appropriate abnormality determination can be performed according to the measurement target, etc., of the sensor 121. Furthermore, since the data group including the intra-range data is subjected to the statistical process, more appropriate abnormality determination can be performed by use of the data group in which variations in the measurement values, etc., are suppressed, as compared to the case where abnormality determination is performed by use of a plurality of pieces of sensor data as they are.

Therefore, in the management method according to the embodiment of the present disclosure, monitoring of the apparatuses X based on the measurement results of the sensors 121 can be performed more appropriately.

The above embodiment is merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional note below.
[Additional Note 1]
A management device comprising:
an acquisition unit configured to acquire sensor data indicating a measurement result of a sensor;
a display control unit configured to perform control of displaying a screen that receives a setting of a monitoring target range regarding measurement values; and
a calculation unit configured to perform a statistical process for a data group including intra-range data, the intra-range data being the sensor data included in the monitoring target range regarding the measurement values, out of the sensor data acquired by the acquisition unit, wherein
the display control unit further performs control of displaying a screen that receives a setting of a determination condition of abnormality determination,
the management device further comprises an output unit configured to perform a predetermined output when a result of the statistical process performed by the calculation unit satisfies the determination condition,
the display control unit performs control of displaying the screen that receives the setting of the monitoring target range such that the screen includes a graph showing time-series changes in the measurement result of the sensor,
the display control unit performs control of displaying the screen that receives the setting of the abnormality determination such that the screen includes an input box for a threshold value, regarding the measurement values, used as the determination condition, and
the calculation unit performs, as the statistical process, an averaging process for a plurality of pieces of the sensor data.

Figure 16:
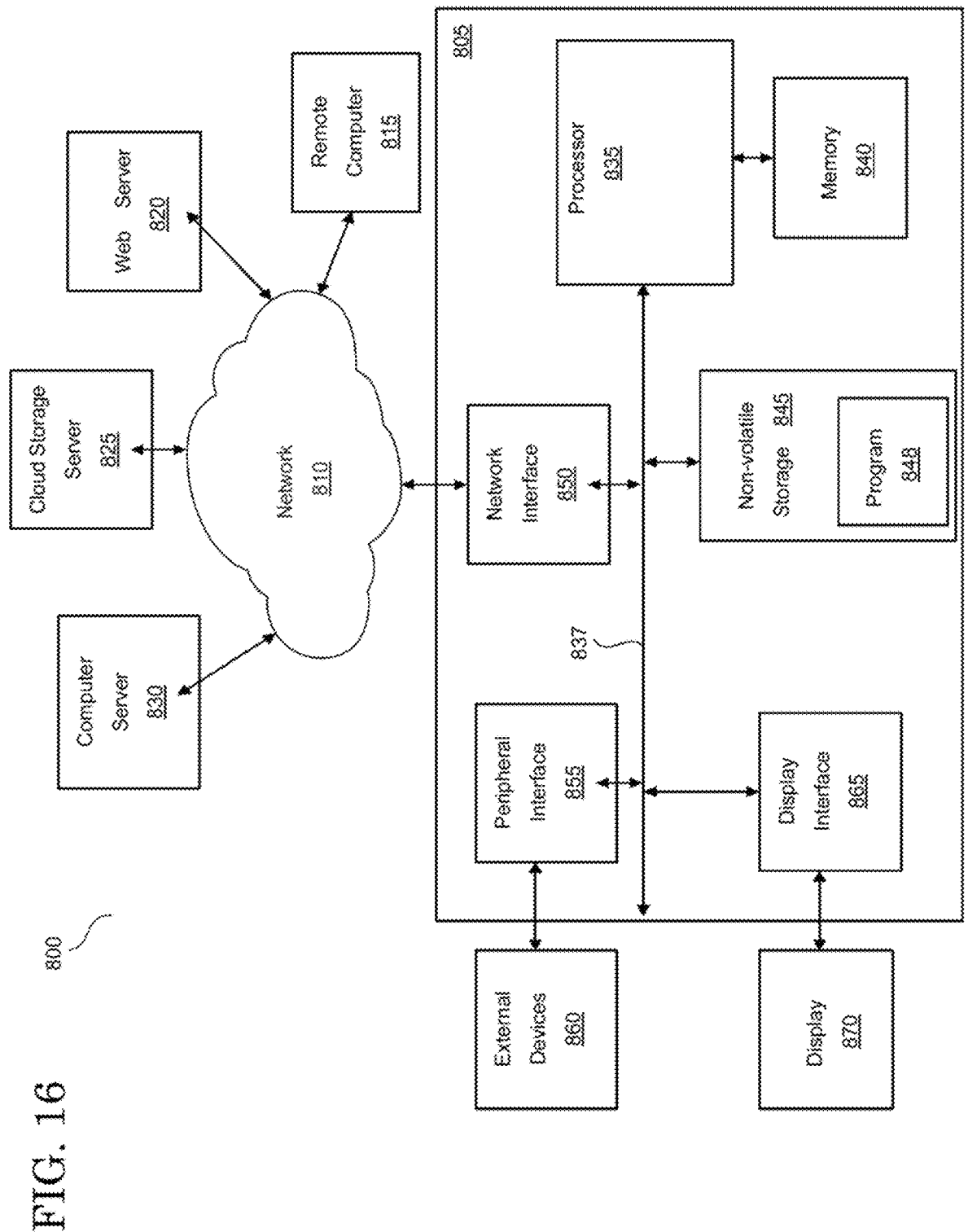
FIG. 16 illustrates a block diagram of a computer that may implement the various embodiments of the management device described herein.

FIG. 16 illustrates a block diagram of a computer that may implement the various embodiments described herein, including the management system 201. The present disclosure may be embodied as a system, a method, and/or a computer program product. The computer program product may include a computer readable storage medium on which computer readable program instructions are recorded that may cause one or more processors to carry out aspects of the embodiment. Moreover, the computer of FIG. 16 may be used to automatically dispatch control operations to apparatuses being monitored by the management system 201 in response to sensed operational conditions of the management system 201 being outside a preset threshold.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 16 is a functional block diagram illustrating a networked system 800 of one or more networked computers and servers. In an embodiment, the hardware and software environment illustrated in FIG. 16 may provide an exemplary platform for implementation of the software and/or methods according to the present disclosure.

Referring to FIG. 16, a networked system 800 may include, but is not limited to, computer 805, network 810, remote computer 815, web server 820, cloud storage server 825 and computer server 830. In some embodiments, multiple instances of one or more of the functional blocks illustrated in FIG. 16 may be employed.

Additional detail of computer 805 is shown in FIG. 16. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage, and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

REFERENCE SIGNS LIST 11 acquisition unit
12 storage unit
13 extraction unit
14 processing unit
15 display control unit
16 input reception unit
21 calculation unit
22 determination unit (output unit)
101 management device
121 sensor
131 display device
201 management system

I claim:
1. A management device comprising:
circuitry configured to
acquire sensor data from a plurality of sensors, the sensor data includes measurement results of at least one sensor of the plurality of sensors,
control display of first content on a first screen in response to receiving a setting of a monitoring target range regarding measurement values, and control display of second content on a second screen in response to receiving a setting of a determination condition of an abnormality determination,
perform a statistical process on a data group including intra-range data, the intra-range data being the sensor data included in the monitoring target range regarding the measurement values, out of the sensor data previously acquired,
in response to a result of the statistical process satisfying the determination condition, perform a predetermined output operation related to the abnormality determination,
control display of an area screen that shows states of a plurality of areas,
determine a state of the area on the area screen, according to predetermined priorities regarding types of the states of the apparatuses, among the states of the apparatuses in the area, and
control an apparatus screen to be displayed in response to a predetermined operation performed to the state of the area on the area screen.
2. The management device according to claim 1, wherein the circuitry is configured to present the first screen and the second screen on a common display apparatus.
3. The management device according to claim 1, wherein the predetermined output operation includes transmission of a control signal that adjusts an operational setting of an apparatus being monitored by the at least one sensor.
4. The management device according to claim 1, wherein the circuitry is further configured to:
control display of a third screen in response to receiving a setting of a monitoring target range regarding a period, and
perform the statistical process for the data group, wherein the intra-range data being the sensor data that are included in the monitoring target range regarding the measurement values and the period.
5. The management device according to claim 4, wherein cyclic periods are set as the period on the third screen.
6. The management device according to claim 1, wherein the circuitry is further configured to:

control display of a user-selectable setting that triggers the circuitry to perform a method for processing extra-range data that are the sensor data not included in the intra-range data, and perform the statistical process for the data group in which a processing result of the extra-range data obtained by the method for processing is added to the intra-range data.

7. The management device according to claim 1, wherein the circuitry is further configured to:

control display of a sensor screen that shows an indication of the apparatus, and states of measurement results of a plurality of sensors mounted on the apparatus, the states of the measurement results are displayed in different modes on the sensor screen, according to whether corresponding sensor data satisfies the determination condition, and in response to an operation performed to the states on the sensor screen, the circuitry controls a change of content on the sensor screen related to at least one of the intra-range data and the determination condition, or a screen for transition to the sensor screen.

8. A management device according to claim 7, wherein the circuitry is further configured to:

control display of the apparatus screen that shows the area, and states of a plurality of apparatuses installed in the area, determine a state of the apparatus on the apparatus screen, according to predetermined priorities regarding types of the states, among the states of the measurement results of the plurality of sensors mounted on the apparatus, and control the sensor screen to be displayed in response to a predetermined operation to the state of the apparatus has been performed on the apparatus screen.

9. The management device according to claim 8, wherein the circuitry is further configured to:

control the apparatus screen to further display contents regarding the plurality of sensors mounted on the apparatus, and under a condition that a plurality of results of the statistical process corresponding to the plurality of sensors mounted on the apparatus satisfy the determination condition, select, out of the plurality of sensors mounted on the apparatus, a sensor corresponding to the result of the statistical process that has most recently been determined to satisfy the determination condition, and then control the apparatus screen to display content regarding the sensor.

10. A management method performed by a management device, comprising:

acquiring sensor data from a plurality of sensors, the sensor data includes measurement results of at least one sensor of the plurality of sensors;

displaying first content on a first screen in response to receiving a setting of a monitoring target range regarding measurement values;

displaying second content on a second screen in response to receiving a setting of a determination condition of abnormality determination;

performing a statistical process for a data group including intra-range data, the intra-range data being the sensor data included in the monitoring target range regarding the measurement values, out of the acquired sensor data;

in response to a result of the statistical process satisfying the determination condition, performing a predetermined output operation related to the abnormality determination;

controlling display of an area screen that shows states of a plurality of areas;

determining a state of the area on the area screen, according to predetermined priorities regarding types of the states of the apparatuses, among the states of the apparatuses in the area; and controlling an apparatus screen to be displayed in response to a predetermined operation performed to the state of the area on the area screen.

11. The management method according to claim 10, wherein:

the first screen and the second screen are displayed on a common display apparatus.

12. The management method according to claim 10, wherein the predetermined output operation includes sending a control signal to an apparatus to adjust an operational setting of the apparatus that is monitored by the at least one sensor.

13. The management method according to claim 10, further comprising:

controlling display of a third screen in response to receiving a setting of a monitoring target range regarding a period, and performing the statistical process for the data group, wherein the intra-range data being the sensor data that are included in the monitoring target range regarding the measurement values and regarding the period.

14. The management method according to claim 13, wherein cyclic periods are set as the period on the third screen.

15. A non-transitory computer-readable storage medium having stored therein computer-readable instructions as part of a management program used in a management device, the program when executed by a computer causing the computer to implement a method, the method comprising:

acquiring sensor data from a plurality of sensors, the sensor data includes measurement results of at least one sensor of the plurality of sensors;

displaying first content on a first screen in response to receiving a setting of a monitoring target range regarding measurement values;

displaying second content on a second screen in response to receiving a setting of a determination condition of abnormality determination;

performing a statistical process for a data group including intra-range data, the intra-range data being the sensor data included in the monitoring target range regarding the measurement values, out of the acquired sensor data;

in response to a result of the statistical process satisfying the determination condition, performing a predetermined output operation related to the abnormality determination;

controlling display of an area screen that shows states of a plurality of areas;

determining a state of the area on the area screen, according to predetermined priorities regarding types of the states of the apparatuses, among the states of the apparatuses in the area; and controlling an apparatus screen to be displayed in response to a predetermined operation performed to the state of the area on the area screen.

16. The non-transitory computer-readable storage medium according to claim 15, wherein:
the first screen and the second screen are displayed on a common display apparatus.

17. The non-transitory computer-readable storage medium according to claim 15, wherein:
the predetermined output operation includes sending a control signal to an apparatus to adjust an operational setting of the apparatus that is monitored by the at least one sensor.

18. The non-transitory computer-readable storage medium according to claim 15, wherein the method further comprising:
controlling display of a third screen in response to receiving a setting of a monitoring target range regarding a period, and
performing the statistical process for the data group, wherein the intra-range data being the sensor data that are included in the monitoring target range regarding the measurement values and regarding the period.

19. The non-transitory computer-readable storage medium according to claim 18, wherein cyclic periods are set as the period on the third screen.

* * * * *